(12) United States Patent
Ekin et al.

(10) Patent No.: US 10,762,380 B2
(45) Date of Patent: Sep. 1, 2020

(54) REGISTRATION SYSTEM FOR REGISTERING AN IMAGING DEVICE WITH A TRACKING DEVICE

(71) Applicant: KONINKLIJKE PHILIPS N.V., Eindhoven (NL)

(72) Inventors: Ahmet Ekin, Eindhoven (NL); Laurent Verard, Katonah, NY (US); Femke Van Belzen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 617 days.

(21) Appl. No.: 14/906,289

(22) PCT Filed: Jul. 1, 2014

(86) PCT No.: PCT/EP2014/063904
§ 371 (c)(1),
(2) Date: Jan. 20, 2016

(87) PCT Pub. No.: WO2015/010859
PCT Pub. Date: Jan. 29, 2015

(65) Prior Publication Data
US 2016/0171714 A1 Jun. 16, 2016

(30) Foreign Application Priority Data
Jul. 23, 2013 (EP) .................................. 13177524

(51) Int. Cl.
*G06K 9/00* (2006.01)
*G06K 9/52* (2006.01)
(Continued)

(52) U.S. Cl.
CPC ............. *G06K 9/52* (2013.01); *G06T 7/0012* (2013.01); *G06T 7/246* (2017.01); *G06T 7/33* (2017.01);
(Continued)

(58) Field of Classification Search
CPC . G06T 2207/10072; G06T 2207/20096; G06T 2207/30021; G06T 2207/30204; G06T 2200/24; G06T 7/0012
See application file for complete search history.

(56) References Cited

U.S. PATENT DOCUMENTS 7,772,541 B2    8/2010  Froggatt et al.
8,364,245 B2    1/2013  Kruecker
(Continued)

FOREIGN PATENT DOCUMENTS

JP    2010115429 A    5/2010
JP    2010240253 A    10/2010
JP    2012179272 A    9/2012

OTHER PUBLICATIONS

Krissian, K. et al., "Model-Based Detection of Tubular Structures in 3D images", Computer Vision and Image Understanding, vol. 80, No. 2, pp. 130-171 (2000).
(Continued)

*Primary Examiner* — Avinash Yentrapati

(57) ABSTRACT

The invention relates to a registration system (13) for registering an imaging device (2) like an x-ray C-arm device with a tracking device (4) like an optical shape sensing tracking device. An object detection unit (5) is adapted to a) allow a user to add markers to an image of an object for indicating arbitrary positions on the object and b) provide a representation of the object based on the added markers, wherein a registration unit (6) determines registration parameters based on a location of the object tracked by the tracking device and on the location of the representation. This kind of registration can be performed with any object being visible for the user in the image, thereby permitting to use a wide variety of objects for the registration.

24 Claims, 17 Drawing Sheets

(51) Int. Cl.
*G06T 7/73* (2017.01)
*G06T 7/33* (2017.01)
*G06T 7/246* (2017.01)
*G06T 7/00* (2017.01)
*G06T 7/60* (2017.01)
*G06K 9/46* (2006.01)

(52) U.S. Cl.
CPC .............. *G06T 7/60* (2013.01); *G06T 7/73* (2017.01); *G06T 7/75* (2017.01); *G06K 2009/4666* (2013.01); *G06T 2200/04* (2013.01); *G06T 2200/24* (2013.01); *G06T 2207/10072* (2013.01); *G06T 2207/20096* (2013.01); *G06T 2207/30021* (2013.01); *G06T 2207/30204* (2013.01)

(56) References Cited

U.S. PATENT DOCUMENTS

| | | | | |
|---|---|---|---|---|
| 8,526,691 | B2* | 9/2013 | Strehl | G01R 33/286 382/128 |
| 8,693,730 | B2* | 4/2014 | Umasuthan | A61B 1/00149 382/103 |
| 8,737,708 | B2* | 5/2014 | Hartmann | A61B 6/12 382/128 |
| 9,430,717 | B2* | 8/2016 | Denissen | A61B 34/20 |
| 9,571,191 | B2* | 2/2017 | Oshima | H04B 10/541 |
| 2002/0087101 | A1* | 7/2002 | Barrick | A61B 5/1126 600/587 |
| 2002/0168069 | A1* | 11/2002 | Tehranchi | G06T 1/005 380/235 |
| 2004/0190716 | A1* | 9/2004 | Nelson | H04N 5/913 380/54 |
| 2004/0247120 | A1* | 12/2004 | Yu | H04N 5/913 380/202 |
| 2005/0254683 | A1* | 11/2005 | Schumann | H04N 5/913 382/100 |
| 2006/0184016 | A1* | 8/2006 | Glossop | A61B 1/2676 600/434 |
| 2007/0065077 | A1* | 3/2007 | Childers | G01D 5/35303 385/37 |
| 2007/0180254 | A1* | 8/2007 | Schumann | H04N 5/913 713/176 |
| 2008/0080754 | A1* | 4/2008 | Barbu | A61B 6/12 382/128 |
| 2008/0219536 | A1* | 9/2008 | Liao | G06K 9/32 382/131 |
| 2008/0242978 | A1* | 10/2008 | Simon | A61B 90/36 600/426 |
| 2009/0069704 | A1* | 3/2009 | MacAdam | G06T 7/0012 600/523 |
| 2009/0137952 | A1* | 5/2009 | Ramamurthy | G01L 1/242 604/95.01 |
| 2010/0056904 | A1* | 3/2010 | Saunders | A61B 6/12 600/424 |
| 2010/0121181 | A1* | 5/2010 | Wang | G06T 7/246 600/424 |
| 2010/0183196 | A1* | 7/2010 | Fu | A61B 8/08 382/103 |
| 2010/0246923 | A1* | 9/2010 | Nathaniel | A61B 6/461 382/132 |
| 2011/0112398 | A1* | 5/2011 | Zarkh | A61B 6/503 600/424 |
| 2012/0150025 | A1 | 6/2012 | Kirchberg et al. | |
| 2012/0201421 | A1* | 8/2012 | Hartmann | A61B 6/5235 382/103 |
| 2012/0232384 | A1* | 9/2012 | Wu | G06T 7/248 600/434 |
| 2013/0072788 | A1* | 3/2013 | Wu | G06T 7/251 600/424 |
| 2014/0086587 | A1* | 3/2014 | Roberts | H04B 10/116 398/115 |
| 2014/0114180 | A1* | 4/2014 | Jain | A61B 6/12 600/424 |
| 2014/0155737 | A1* | 6/2014 | Manzke | A61B 8/5261 600/417 |
| 2014/0187919 | A1 | 7/2014 | Parthasarathy et al. | |
| 2014/0243660 | A1 | 8/2014 | Klinder et al. | |
| 2014/0286644 | A1* | 9/2014 | Oshima | H04B 10/116 398/118 |
| 2014/0294263 | A1* | 10/2014 | Hermosillo Valadez | G06T 7/33 382/128 |
| 2015/0016680 | A1* | 1/2015 | Mack | G06T 19/006 382/103 |
| 2015/0208948 | A1* | 7/2015 | Wei | A61B 5/066 600/424 |
| 2015/0245882 | A1* | 9/2015 | Venkatraghavan | A61B 1/00009 600/424 |
| 2016/0191158 | A1* | 6/2016 | Aoyama | H04B 10/54 398/172 |
| 2016/0242854 | A1* | 8/2016 | Grass | G06T 5/002 |
| 2017/0099102 | A1* | 4/2017 | Oshima | H04B 10/11 |

OTHER PUBLICATIONS

Frangi, A.F. et al, "Multiscale vessel enhancement filtering", Medical Image Computing and Computer-Assisted Intervention—MICCAI'98, Lecture Notes in Computer Science, vol. 1496, pp. 130-137 (1998).

Canny, J. "A computational approach to edge detection", IEEE Transactions on Pattern Analysis and Machine Intelligence, vol. 8, No. 6, pp. 679-698 (1986).

* cited by examiner

REGISTRATION SYSTEM FOR REGISTERING AN IMAGING DEVICE WITH A TRACKING DEVICE

CROSS-REFERENCE TO PRIOR APPLICATIONS

This application is the U.S. National Phase application under 35 U.S.C. § 371 of International Application Serial No. PCT/EP2014/063904, filed on Jul. 1, 2014, which claims the benefit of European Patent Application No. 13177524.9, filed on Jul. 23, 2013. These applications are hereby incorporated by reference herein.

FIELD OF THE INVENTION

The invention relates to a registration system, a registration method and a registration computer program for registering an imaging device with a tracking device. The invention relates further to an imaging system, an imaging method and an imaging computer program for imaging an object. The invention relates also to an interventional system comprising the imaging system.

BACKGROUND OF THE INVENTION

WO 2013/001388 A1 discloses a system for providing a live three-dimensional image of a body lumen. The system comprises an x-ray system for generating an x-ray image of the body lumen and an optical shape sensing (OSS) device for determining a three-dimensional shape of a flexible surgical tool within the body lumen. The determined three-dimensional shape of the flexible surgical tool and the x-ray image of the body lumen are registered to each other based on, inter alia, a segmentation of the surgical tool in the x-ray image.

US 2010/0056904 A1 discloses an interventional system comprising an interventional instrument like a catheter to be navigated from an insertion site to a treatment site within a patient. During the navigation procedure the interventional instrument, which is equipped with an optical fiber member, is tracked by using OSS, wherein the tracked location is shown on a magnetic resonance image of the patient. In order to show the location of the interventional instrument tracked by OSS on the magnetic resonance image of the patient, an OSS tracking system for tracking the interventional instrument and a magnetic resonance imaging system for generating the magnetic resonance image need to be registered to each other. The registration is performed by marking within the magnetic resonance image a plurality of known points on the optical fiber member of the interventional instrument, wherein the known points carry markers visible in the magnetic resonance image.

This interventional procedure can only be performed with specific interventional instruments, which are equipped with an optical fiber member having markers, which are visible in the magnetic resonance image, at known points. The interventional procedure is therefore limited to certain interventional instruments only.

SUMMARY OF THE INVENTION

It is an object of the present invention to provide a registration system, a registration method and a registration computer program for registering an imaging device for generating an image of an object with a tracking device for tracking the location of the object, wherein the limitation to certain objects is reduced. Moreover, it is an object of the present invention to provide an imaging system, an imaging method and an imaging computer program for imaging the object, which use a registration result obtained from the registration system. It is a further object of the present invention to provide an interventional system comprising the imaging system.

In a first aspect of the present invention a registration system is presented, wherein the registration system is adapted to register an imaging device for generating an image of an object with a tracking device for tracking the location of the object within a field of view of the imaging device by determining the position and shape of the object, wherein the registration system comprises:

an object detection unit for detecting the object in the image, wherein the object detection unit is adapted to a) allow a user to add markers to the image for indicating arbitrary positions in the image, at which the object is located, and b) provide a representation of the object in the image based on the added markers, a registration unit for determining registration parameters defining a registration of the tracking device with the imaging device, wherein the registration unit is adapted to determine the registration parameters based on the tracked location of the object in the field of view of the imaging device and on the location of the representation of the object in the image.

Since the object detection unit is adapted to allow the user to add markers to the image for indicating arbitrary positions in the image, at which the object is located, wherein then these markers at the arbitrary positions are used for providing the representation of the object in the image, on which the registration is based, the object does not need to have an optical fiber member carrying markers at a plurality of known positions, which need to be marked. The user just needs to add markers to the image at arbitrary positions, wherein these arbitrary positions do not need to be known with respect to, for instance, the object and correspondingly the object does not need to have markers at known positions. The registration can be performed with any object being visible for the user in the image, thereby reducing the limitation to certain objects that can be used for the registration.

The object is preferentially a device, for instance, an interventional instrument like a catheter, a needle, a guidewire et cetera.

In an embodiment the imaging device is adapted to generate a two-dimensional projection image of the field of view, wherein the object detection unit is adapted to a) allow the user to add the markers to the two-dimensional projection image for indicating the object in the two-dimensional projection image and b) provide a representation of the object in the two-dimensional projection image based on the added markers and wherein the registration unit is adapted to determine the registration parameters based on the tracked location of the object in the field of view of the imaging device and on the location of the representation of the object in the two-dimensional projection image. In particular, the imaging device is adapted to generate at least two two-dimensional projection images, which correspond to different projection directions, wherein the object detection unit is adapted to a) allow the user to add markers to each of the two-dimensional projection images for indicating the object in the different two-dimensional projection images and b) provide representations of the object in the two-dimensional projection images based on the added markers and wherein the registration unit is adapted to determine the registration parameters based on the tracked location of the object in the imaging region and on the locations of the representations of the object in the two-dimensional projection images. The imaging device is preferentially adapted to generate one or several two-dimensional x-ray projection images. After the registration parameters have been determined, the actual location of the object can be shown on the respective two-dimensional projection image, even if the respective two-dimensional projection image is not an actual image, but an older one. Thus, for instance, during an interventional procedure the location of the object, which is an interventional instrument in this example, can be shown in different two-dimensional projection images, while the object is moved, without requiring that actual two-dimensional projection images are provided.

The tracking device is preferentially adapted to track the three-dimensional location of the object, wherein the registration unit is adapted to determine the registration parameters by calculating a two-dimensional projection of the tracked three-dimensional location of the object under consideration of a projection geometry used by the imaging device for generating the two-dimensional projection image and by calculating a spatial transformation between a coordinate system defined by the tracking device and a coordinate system defined by the imaging device, which minimizes a deviation between the calculated two-dimensional projection of the tracked three-dimensional location of the object and the location of the representation of the object in the two-dimensional projection image. This allows determining the registration parameters relatively accurately, although the tracked location is three-dimensional and the image is two-dimensional.

It is preferred that the tracking device is adapted to track the location of the object by OSS, wherein the registration unit is adapted to determine the registration parameters based on the location of the object in the field of view of the imaging device tracked by OSS and on the location of the representation of the object in the image. OSS allows tracking the location of the object very accurately and in a way, which can easily be handled by the user. For instance, it is not necessary to provide additional fields like electromagnetic fields for tracking the location of the object.

The object detection unit can be adapted to provide the added markers as the representation of the object in the image. However, the object detection unit can also be adapted to determine, in particular, calculate, the representation based on the added markers. For instance, if object is a longish object, the object detection unit can be adapted to determine the representation of the object in the image by connecting the added markers by lines. Thus, the object can be represented by multiple line segments connecting the added markers. However, the object detection unit may also be adapted to determine the representation of the object in the image by fitting a curve to the added markers. Moreover, the object detection unit may be adapted to provide the representation of the object in the image based on the added markers and based on image values of the image. Additionally considering image values, while providing the representation of the object in the image, can lead to a representation, which better fits to the position and shape of the object in the image, thereby improving the accuracy of the registration.

For instance, the object detection unit can be adapted to determine location information being indicative of the location of the object in the image based on image values of the image and to provide the representation of the object in the image based on the added markers and based on the location information. In particular, the object detection unit can be adapted to apply an object detection algorithm to the image for generating the location information being indicative of the location of the object in the image, i.e., for instance, being indicative of the spatial run of a longish object within the image. For example, a segmentation algorithm can be applied to the image for segmenting the object in the image, wherein the segmented object is, in this example, the location information. Since the manually added markers indicating arbitrary positions in the image, at which the object is located, are supposed to be more reliable than the automatically determined location information, the object detection unit is preferentially adapted such that during the determination of the representation of the object in the image the added markers are weighted more than the location information. For instance, for determining the representation a cost function can be used, which decreases with decreasing distances between the representation and the added markers and with a decreasing distance between the location of the object in the image as indicated by the location information determined from the image values and the representation, wherein the distances between the representation and the added markers may contribute more to the cost function than the distances between the location indicated by the location information determined from the image values and the representation. The object detection unit can be adapted to determine the representation by minimizing the cost function.

The object detection unit may be adapted to provide the representation of the object in the image by correcting the positions of the added markers depending on location information, which is indicative of the location of the object in the image and which has been determined based on image values of the image, and by providing the representation of the object in the image based on the corrected positions of the markers. For instance, a measure being indicative of the likelihood that an imaging region, which may be formed by one or several image elements, corresponds to the object may be applied to the image region defined by the location information and to an image region defined by a user-added marker, wherein, if the difference between the measure applied to the image region defined by the location information and the measure applied to the image region defined by the user-added marker is larger than a predefined threshold, it may be determined whether a shifted marker, which is located in the neighborhood of the user-added marker, leads to a smaller difference. If this is the case, the shifted marker may be used instead of the user-added marker and may be regarded as being a corrected marker. In this way at least one marker may be corrected, wherein the representation of the object in the image may then be provided based on the at least one corrected marker and optionally further user-added markers, which have not been corrected, because they already initially indicated the location of the object in the image with sufficient accuracy, i.e., for example, because a shifted marker did not lead to a smaller difference between the measure applied to the image region defined by the respective marker and the measure applied to the image region defined by the location information. The measure can be, for instance, the vesselness response. Correcting the positions of the added markers depending on the location information, wherein then the representation of the object in the image is provided based on the corrected positions of the markers, can further improve the accuracy of the registration, particularly if the user has only roughly added the markers to the image.

The imaging device can be adapted to provide at least two two-dimensional projection images, which correspond to different projection directions, wherein the object detection unit may be adapted to a) allow the user to add markers to a first image of the two-dimensional projection images for indicating the object in the first image and b) provide a first representation of the object in the first image based on the added markers and a second representation of the object in a second image of the two-dimensional projection images based on image values of the second image, and wherein the registration unit may be adapted to determine the registration parameters based on the tracked location of the object in the imaging region and on the locations of the first and second representations of the object in the first and second images. For instance, the object detection unit can apply an object detection algorithm to the image values of the second image, in order to determine location information being indicative of the location of the object in the second image. This object detection algorithm is, for example, a segmentation algorithm for segmenting the object in the second image, wherein the segmented object can be regarded as being the location information defining the second representation in the second image. During the determination of the registration parameters the first representation in the first image, which has been provided based on the added markers, is preferentially considered more than the second representation of the object in the second image, because the first representation, which is based on user inputs, is supposed to be more reliable than the second representation. This allows considering representations in different projection images during the registration process, without requiring the user to add in each projection image markers indicating the position of the object in the respective projection image.

In another aspect of the present invention an imaging system for imaging an object is presented, wherein the imaging system comprises:

an imaging device for generating an image of a region of interest (ROI) by determining the position and shape of the object, a tracking device for tracking the location of the object in the region of interest, a registration system as defined herein for determining registration parameters, a location determination unit for determining the location of the object within the image of the region of interest based on the tracked location of the object and the determined registration parameters.

Since the location of the object within the image of the region of interest is determined based on the tracked location of the object and the determined registration parameters, it is not necessary that the image of the region of interest is an actual image showing the actual location of the object in the region of interest. In fact, the image of the region of interest can be an older one, wherein in this image the actual location of the object within the region of interest can be shown based on the registration parameters and the actually tracked location of the object.

In a further aspect of the present invention an interventional system is presented, wherein the interventional system comprises:

an interventional instrument for carrying out an interventional procedure, and an imaging system for imaging the interventional instrument as defined herein.

In another aspect of the present invention a registration method is presented, wherein the registration method is adapted to register an imaging device for generating an image of an object with a tracking device for tracking the location of the object in a field of view of the imaging device by determining the position and shape of the object, wherein the registration method comprises:

detecting the object in the image by an object detection unit, wherein the object detection unit a) allows a user to add markers to the image for indicating arbitrary positions in the image, at which the object is located, and b) provides a representation of the object in the image based on the added markers, determining registration parameters defining a registration of the tracking device with the imaging device by a registration unit, wherein the registration unit determines the registration parameters based on the tracked location of the object in the field of view of the imaging device and on the location of the representation of the object in the image.

In a further aspect of the present invention an imaging method for imaging an object is presented, wherein the imaging method comprises:

generating an image of a region of interest by an imaging device, tracking the location of the object in the region of interest by determining the position and shape of the object by a tracking device, determining registration parameters by a registration method as defined herein, generating a location image indicating the location of the object within the image of the region of interest based on the tracked location of the object, the image of the region of interest and the determined registration parameters by a location image generating unit.

In another aspect of the present invention a registration computer program is presented, wherein the registration computer program is adapted to register an imaging device for generating an image of an object with a tracking device for tracking the location of the object in a field of view of the imaging device by determining the position and shape of the object, wherein the registration computer program comprises program code means for causing a registration system as defined herein to carry out the steps of the registration method as defined herein, when the registration computer program is run on a computer controlling the registration system.

In a further aspect of the present invention an imaging computer program for imaging an object is presented, wherein the imaging computer program comprises program code means for causing an imaging system as defined herein to carry out the steps of the imaging method as defined herein, when the imaging computer program is run on a computer controlling the imaging system.

In another aspect of the present invention, a method and user interface are presented wherein an imaging system extends the use of the provided registration to many different workflow scenarios and user preferences, by, for example, being capable of accepting user information for the registration using alternatives such as placing a region of interest on an image and interacting with the region of interest, placing and interacting with two or more regions of interest or choosing between or among selected "candidate" locations of points in the images, such as the location of a tip of an instrument.

It shall be understood that the registration system, the imaging system, the interventional system, the registration method, the imaging method, the registration computer program and the imaging computer program described herein have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
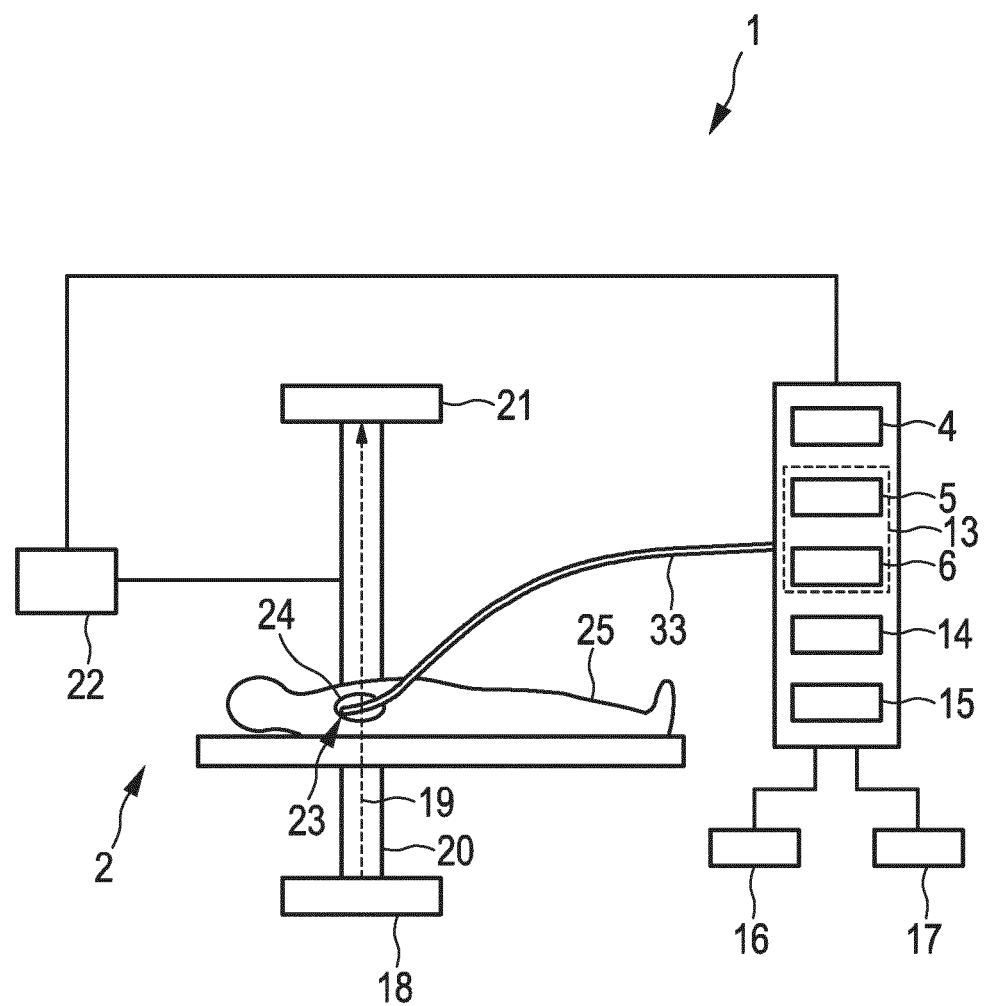
FIG. 1 shows schematically and exemplarily an embodiment of an interventional system.

FIG. 1 shows schematically and exemplarily an embodiment of an interventional system. The interventional system 1 comprises an interventional instrument 33 for carrying out an interventional procedure. In this embodiment the interventional instrument 33 is a catheter, which is controlled by a catheter control unit 15. The catheter control unit 15 and the catheter 33 may be adapted to perform, for instance, an ablation procedure within a heart 24 of person 25 lying on a support means like a patient table 26. However, the catheter 33 and the catheter control unit 15 can also be adapted to perform another interventional procedure. Moreover, the interventional system can also comprise another interventional instrument like a needle. In this embodiment the catheter 33 is adapted to apply a radio frequency (RF) ablation procedure, wherein the catheter control unit 50 is adapted to provide RF energy to ablation electrodes arranged at the tip 23 of the catheter 33.

For inserting the catheter 33 into the heart 24 a guidewire is used, which is a further interventional instrument and which is equipped with an OSS fiber connected to a tracking control unit 4 for determining the location of the guidewire within the person 25, i.e. for determining the position and shape of the guidewire within the person 25, by OSS. For determining the location of the guidewire within the person 25 known OSS techniques can be used like the technique disclosed in U.S. Pat. No. 7,772,541 B2, which is herewith incorporated by reference. The guidewire equipped with the OSS fiber and the tracking control unit 4, in particular, the OSS fiber and the tracking control unit 4, can be regarded as being a tracking device for tracking the location of the guidewire within the person 25.

The interventional system 1 further comprises an imaging device 2 being, in this embodiment, an x-ray C-arm system. The imaging device 2 comprises an x-ray source 18 generating x-rays 19 traversing the person 25 and an x-ray detector 21 for detecting the x-rays after having traversed the person 25. The x-ray source 18 and the x-ray detector 21 are attached to a C-arm 20, which is rotatable around the person 25 for acquiring x-ray projection images in different projection directions. The imaging device is controlled by an imaging device control unit 22, which receives detection values from the x-ray detector 21 and generates the two-dimensional projection images based on the received detection values. The two-dimensional projection images are provided to an object detection unit 5 for detecting the guidewire in the two-dimensional projection images, wherein the object detection unit 5 is adapted to a) allow a user to add markers to the two-dimensional projection images for indicating arbitrary positions in the two-dimensional projection images, at which the guidewire is located, and b) provide a representation of the guidewire in the two-dimensional projection images based on the added markers. The object detection unit 5 preferentially provides a graphical user interface, which allows a user to add the markers to the two-dimensional projection images by using an input unit 16 like a keyboard, a computer mouse, a touch screen, et cetera and a display 17.

Mouse usage may, moreover, be reduced or eliminated in the registration step. In one embodiment, a user completes all steps using a touch screen device. In another embodiment, a user places a marker in a highlighted region on the image without clicking or touching anything. In another embodiment, the user brings a marker to a predefined anatomical region that has been requested by the system or has been input in the planning step.

Figure 2:
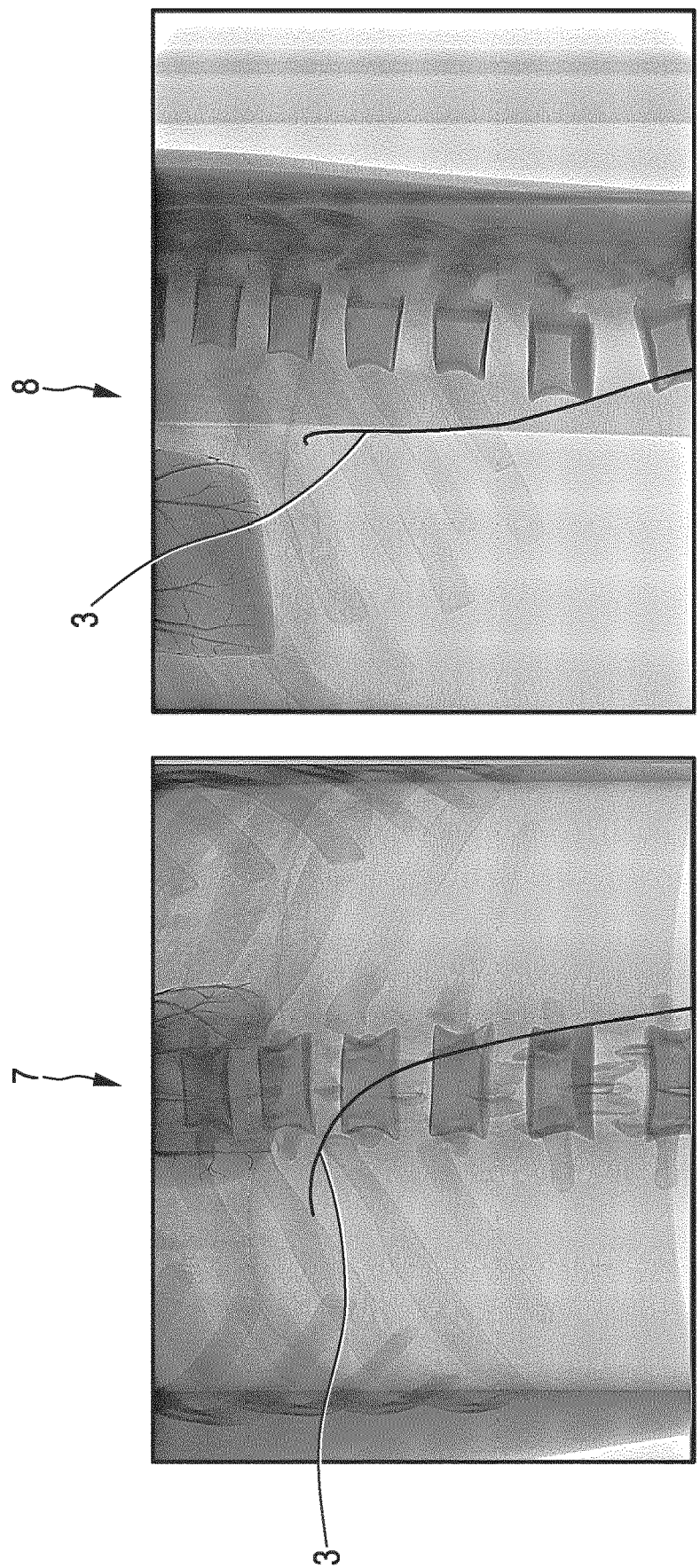
FIG. 2 shows schematically and exemplarily two projection images acquired by an imaging device of the interventional system.
Figure 3:
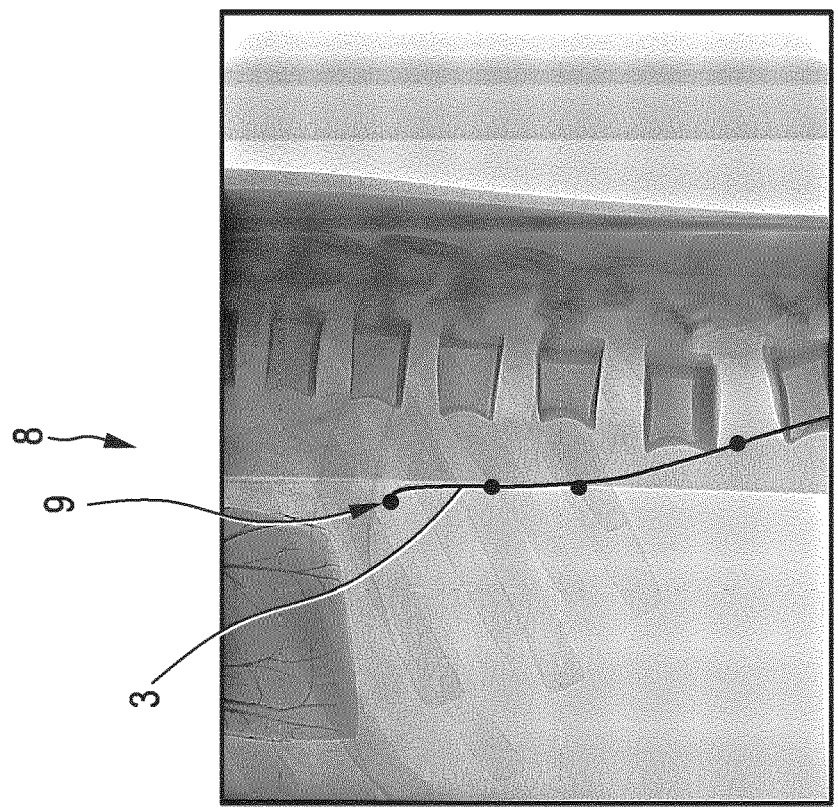
FIG. 3 shows schematically and exemplarily markers added by a user to the projection images.
Figure 3:
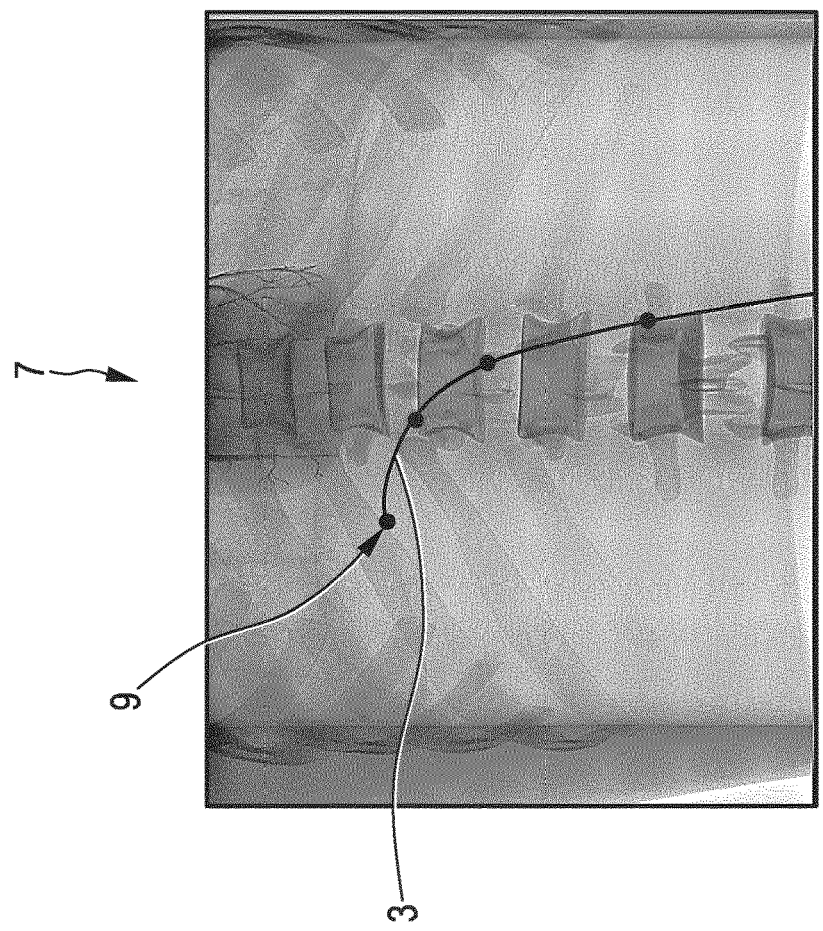
Figure 4:
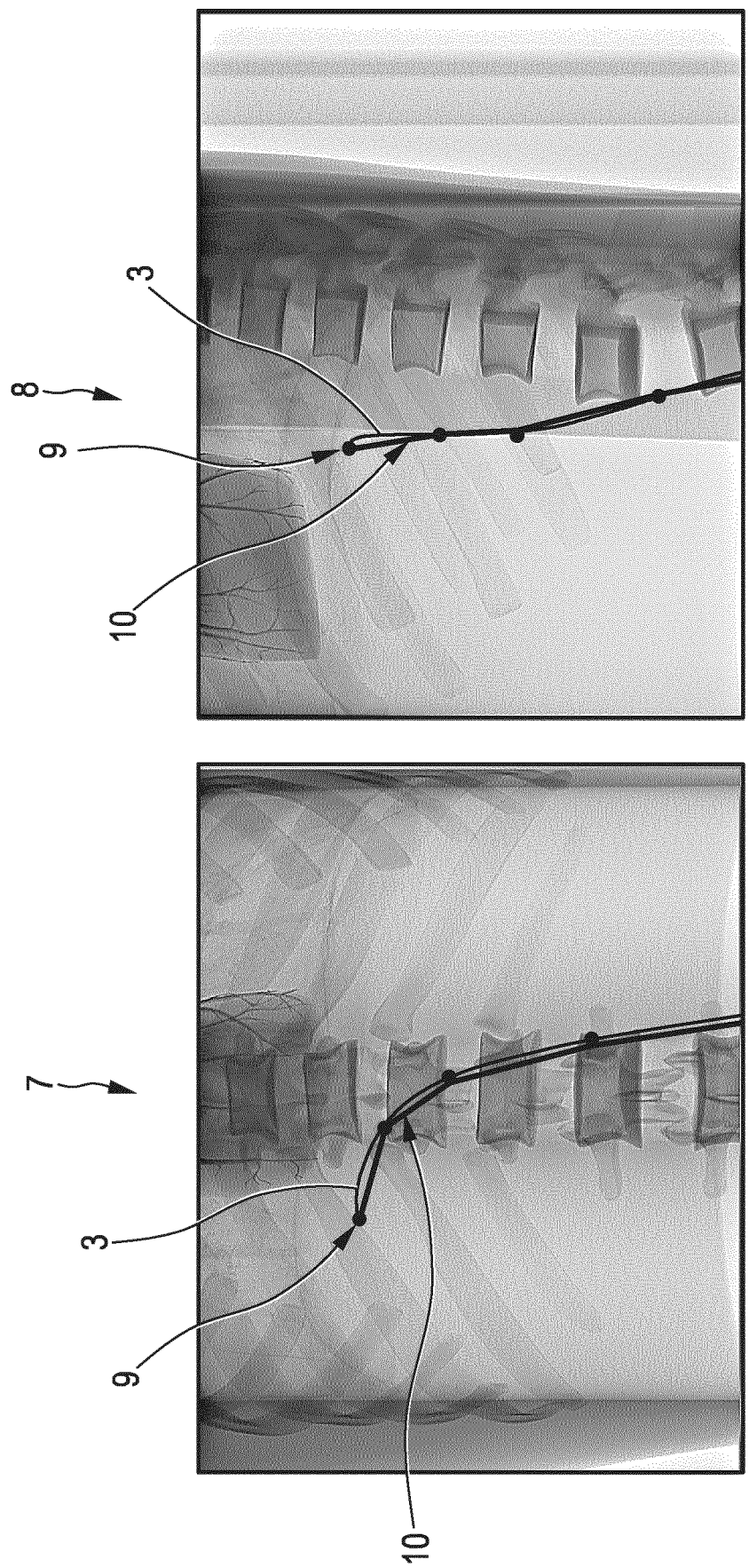
FIG. 4 shows schematically and exemplarily a representation of a guidewire shown in the projection images.

FIG. 2 shows schematically and exemplarily two two-dimensional projection images 7, 8, which have been acquired in different projection directions, wherein each two-dimensional projection image 7, 8 shows the guidewire 3. FIG. 3 shows schematically and exemplarily markers 9, which have been added to the two-dimensional projection images 7, 8 by the user. FIG. 4 shows schematically and exemplarily a representation 10 of the guidewire 3 determined by the object detection unit 5 based on the added markers 9. In this embodiment the object detection unit 5 has determined the representation 10 by just connecting the added marks by multiple line segments. In another embodiment the object detection unit 5 can be adapted to determine the representation based on the added marks in another way, for instance, by fitting a curve to the added markers 9.

The interventional system 1 further comprises a registration unit 6 for determining registration parameters defining a registration of the tracking device 3, 4 with the imaging device 2, wherein the registration unit 6 is adapted to determine the registration parameters based on the tracked location of the guidewire 3 in the field of view of the imaging device 2 and on the locations of the representations 10 of the guidewire 3 in the two-dimensional projection images 7, 8. In particular, the registration unit 6 is adapted to determine the registration parameters by calculating two-dimensional projections of the tracked three-dimensional location of the guidewire 3 under consideration of the projection geometries used by the imaging device for generating the two-dimensional projection images 7, 8 and by calculating a spatial transformation between a coordinate system defined by the tracking device 3, 4 and a coordinate system defined by the imaging device 2, which minimizes a deviation between the calculated two-dimensional projections of the tracked three-dimensional location of the guidewire 3 and the locations of the representations 10 of the guidewire 3 in the two-dimensional projection images 7, 8.

Figure 5:
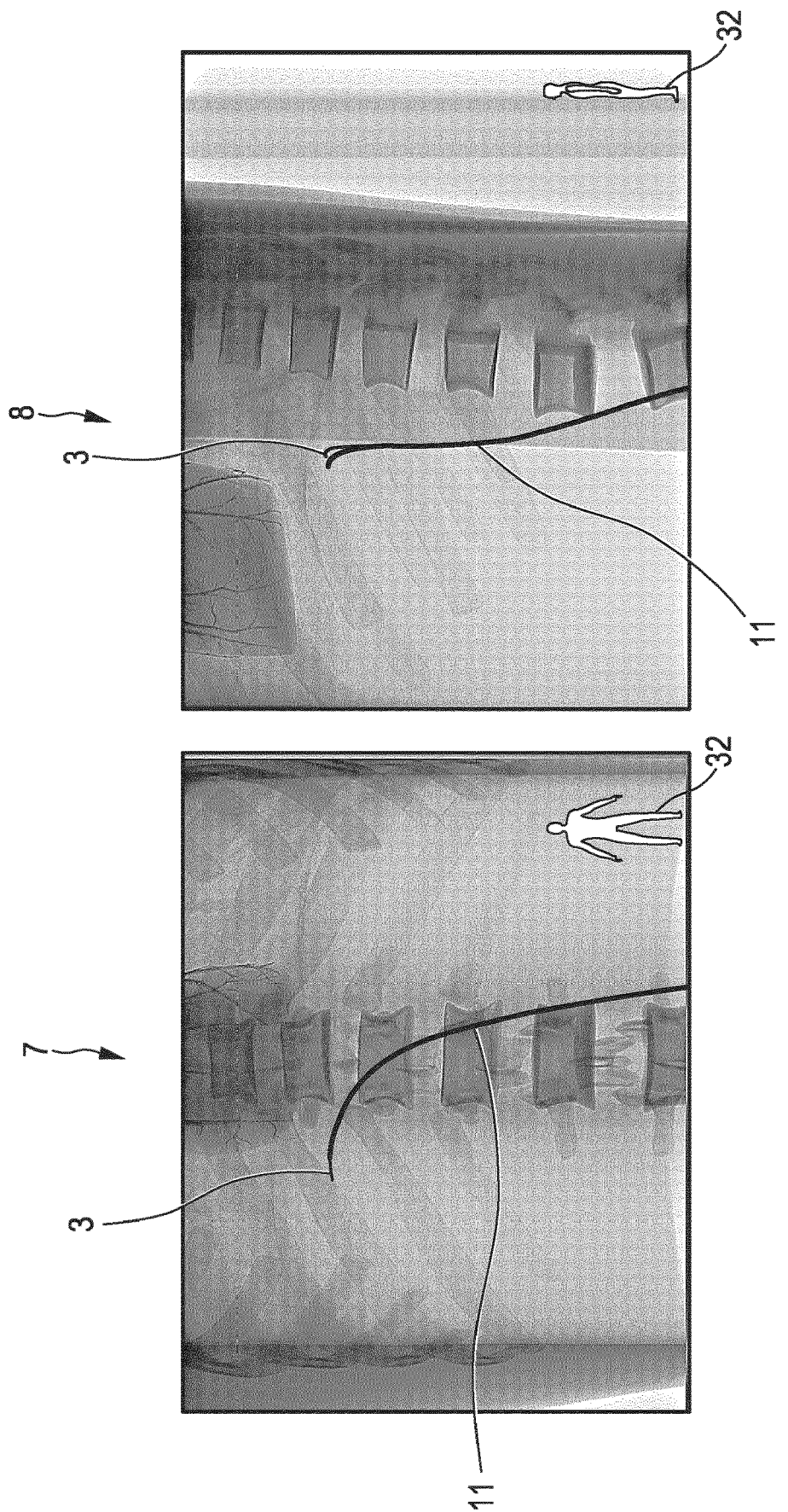
FIG. 5 illustrates schematically and exemplarily a registration result.

FIG. 5 illustrates the registration result. In particular, in FIG. 5 the location of the guidewire 3 as provided by the tracking device is indicated by the bold line 11, which very well corresponds to the location of the guidewire 3 shown in the respective two-dimensional protection image 7, 8. It should be noted that in the two-dimensional projection images 7, 8 shown in FIG. 5 the tip of the guidewire 3 and the tip of the bold line 11 do not overlap, only because in this example physically the OSS fiber does not reach the tip of the guidewire 3. However, if in another embodiment the OSS fiber reaches the tip of the guidewire 3, also the tracked location of the tip of the guidewire 3 will correspond very well to the location of the guidewire 3 shown in the respective projection image such that in FIG. 5 the bold line 11 would completely cover the guidewire 3 in the two-dimensional projection images 7, 8. The person 32 shown in the two-dimensional projection images 7, 8 in FIG. 5 are just used to illustrate the spatial relationship between the two two-dimensional projection images 7, 8. The person 32 is optional and may not be shown on the two-dimensional projection images 7, 8.

After the registration has been completed, the guidewire 3 can be moved within the person 25, wherein during the movement the tracking device 3, 4 can track the location of the guidewire 3 within the person 25 and the tracked location of the guidewire 3 can be shown on the two-dimensional projection images 7, 8, without necessarily acquiring these projection images again, because a location determination unit 14 can determine the location of the guidewire 3 within a previously acquired two-dimensional projection image of a region of interest, in which the guidewire 3 is actually moved, based on the tracked actual location of the guidewire 3 and the determined registration parameters. It is therefore not necessary to continuously acquire the two-dimensional projection images for determining the location of the guidewire 3 within the person 25 relative to the internal anatomy of the person 25.

The object detection unit 5 and the registration unit 6 can be regarded as forming a registration system 13 for registering the imaging device 2 with the tracking device 3, 4. Moreover, the imaging device 2, the tracking device 3, 4, the registration system 13 and the location determination unit 14 can be regarded as forming an imaging system for imaging the guidewire 3 within the person 25.

Figure 6:
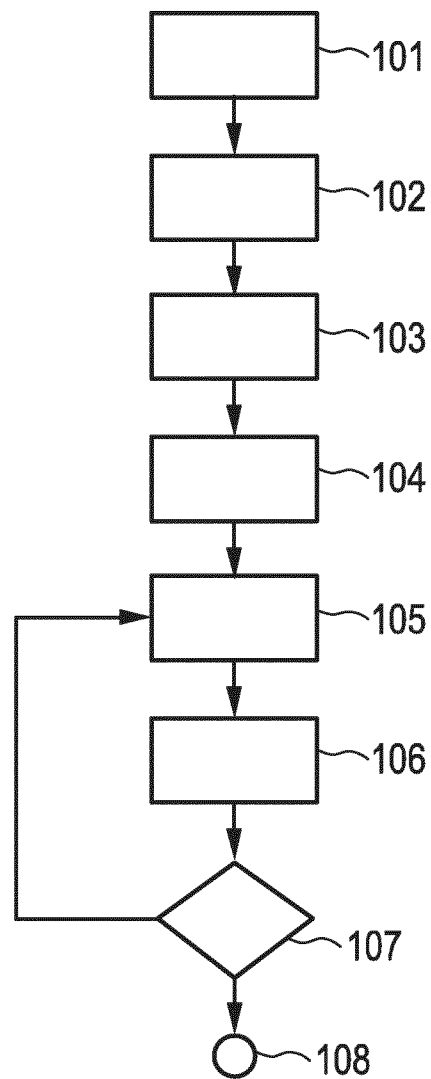
FIG. 6 shows a flowchart exemplarily illustrating an embodiment of an imaging method for imaging the guidewire.

In the following an embodiment of an imaging method for monitoring an interventional procedure will exemplarily be described with reference to a flowchart shown in FIG. 6.

In step 101 the guidewire 3 is arranged in the field of view of the imaging device 2 and the imaging device 2 generates a two-dimensional projection image of the guidewire 3. Moreover, the location of the guidewire 3 within the field view of the imaging device 2 is determined by the tracking device 3, 4. In step 102 the two-dimensional projection image is shown to the user by using the display 17, wherein the user adds markers to the two-dimensional projection image for indicating arbitrary positions in the two-dimensional projection image, at which the guidewire 3 is located, by using the object detection unit 5. Moreover, the object detection unit 5 provides a representation of the guidewire 3 in the two-dimensional projection image based on the added markers. In step 103 the registration unit 6 determines registration parameters defining a registration of the tracking device 3, 4 with the imaging device 2 based on the tracked location of the guidewire 3 in the field of view of the imaging device 2 and on the location of the representation of the guidewire 3 in the two-dimensional projection image. Steps 101 to 103 can be regarded as forming a registration method, which may be performed during a calibration procedure, in which the interventional system is calibrated, before the guidewire 3 is inserted into the person 25.

After the registration parameters have been determined, the person 25 can be arranged on the support means 26 within the field of view of the imaging device 2 such that the imaging device 2 can generate a two-dimensional projection image of a region of interest within the person 25 in step 104. The region of interest is preferentially the region within the person 25, through which the guidewire 3 should be moved. Then, the guidewire 3 can be introduced into the person 25 and during the introduction of the guidewire 3 and the movement of the guidewire 3 within the person 25 the location of the guidewire 3 is tracked by the tracking device 3, 4 in step 105. In step 106 the location of the guidewire 3 within the two-dimensional projection image, which has been acquired in step 104, is determined based on the tracked location of the guidewire 3 and the determined registration parameters and the display 17 shows the determined location of the guidewire 3 within the two-dimensional projection image. In step 107 it is checked whether the imaging of the location of the guidewire 3 within the two-dimensional projection image should be stopped. For instance, it is checked whether the user has input into the interventional system via the input unit 16 that the imaging of the location of the guidewire 3 within the two-dimensional projection image should be stopped. If this is the case, the method ends in step 108. Otherwise, the method continues with step 105. In particular, steps 105 and 106 are continuously performed in a loop, until the imaging of the location of the guidewire 3 within the two-dimensional projection image should stop. By performing steps 105 and 106 in a loop during the movement of the guidewire 3 within the person 25, the user can monitor the movement of the guidewire 3 within the person 25 in real-time, without necessarily acquiring real-time x-ray images. In a further embodiment it can further be checked in step 107 whether the field of view of the imaging device has been modified, wherein in this case the method may continue with step 104.

The registration system preferentially provides a semi-automatic solution for the three-dimensional OSS to two-dimensional x-ray image registration. The registration system is preferentially adapted to allow a user to mark the device, for instance, the guidewire 3, on the x-ray images, wherein the user may select a variable number of points depending on the curvature of the device. The device may then be represented by a line or a curve, wherein the decision whether the device should be represented by a line or curve may depend on computational constraints and/or the required accuracy. Using the device representation and a projection of the three-dimensional OSS data, registration parameters are computed. In this way a registration can be achieved substantially independently of device characteristics, i.e. substantially independently of characteristics of the OSS-tracked device. Moreover, this registration procedure is not limited to a certain imaging modality. Thus, although in the above described embodiments the imaging device is an x-ray C-arm device, in other embodiments also other imaging devices can be registered with the tracking device like other radiographic imaging devices, ultrasound imaging devices, magnetic resonance imaging devices, et cetera.

The object detection unit of the registration system can be adapted to provide a graphical user interface, which allows the user to click on several points on the device like the guidewire 3 shown in the images provided by the imaging device, in order to add the markers to the images. These points preferentially also include a point on the tip of the device.

Although in an above described embodiment the representation of the device, in particular, the representation of the guidewire 3, is provided by connecting the markers added by the user by straight lines, in other embodiments the representation can be determined by a curve fitting procedure, wherein higher-order approximations of the device can be used. The curve can be fitted to the added markers such that the resulting curve achieves the highest intensity difference from the image elements, which are preferentially pixels, adjacent to the image elements on the curve. Also other measures can be used for fitting the curve, wherein the curve is determined such that the respective measure is optimized, i.e. minimized or maximized. For instance, the difference between the sum of a vesselness response for all image elements on the respective curve and the sum of the vesselness response of all neighboring image elements can be used as a measure for fitting the curve. Further alternative measures are, for instance, the first derivative, edge responses, et cetera. The vesselness response may be defined as a function of the Hessian matrix as disclosed, for instance, in the article "Model-Based Detection of Tubular Structures in 3D images" by K. Krissian et al., Computer Vision and Image Understanding, volume 80, number 2, pages 130 to 171(2000) or in the article "Multiscale vessel enhancement filtering" by A. F. Frangi et al., Medical Image Computing and Computer-Assisted Intervention—MICCAI '98, Lecture Notes in Computer Science, volume 1496, pages 130-137 (1998), which are herewith incorporated by reference. The edge response may be determined as disclosed in the article "A Computational Approach To Edge Detection" by J. Canny, IEEE Transactions on Pattern Analysis and Machine Intelligence, volume 8, number 6, pages 679 to 698 (1986), which is also herewith incorporated by reference.

Figure 7:
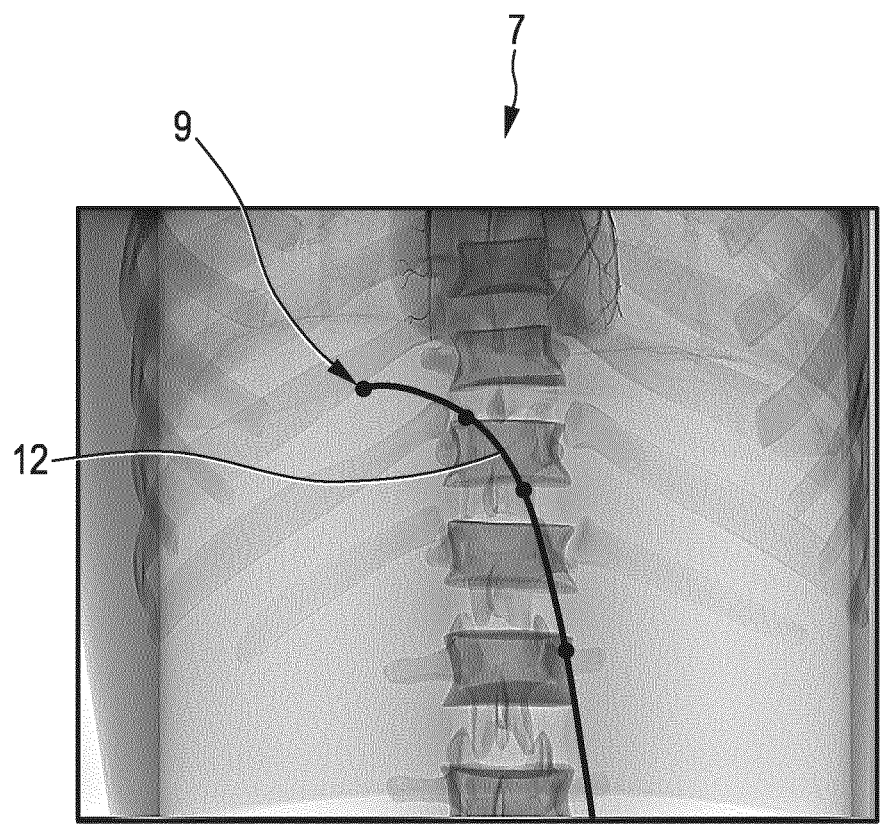
FIG. 7 shows schematically and exemplarily a further representation of the guidewire in a projection image acquired by the imaging device of the interventional system.

Thus, the representation may not only be determined based on the markers added to the respective image, but additionally also based on image values of image elements of the respective image. A representation 12 of the guidewire 3, which achieved a higher score by using the vesselness response measure in comparison to the representation 10 shown in FIG. 4, is schematically and exemplarily shown in FIG. 7.

In an embodiment the object detection unit can be adapted to use the image values of the image elements of the respective image for determining location information being indicative of the location of the guidewire 3 in the respective image and to determine the representation of the guidewire in the respective image based on the added markers and based on the location information. In particular, the object detection unit can be adapted to apply an object detection algorithm like a segmentation algorithm to the respective image for generating the location information being indicative of the location of the object in the respective image. The location information is, for instance, a segmented object. Since the markers indicating arbitrary positions in the respective image, at which the object is located, are supposed to be more reliable than the automatically determined location information, the object detection unit is preferentially adapted such that during the determination of the representation of the object in the respective image the locations of the added markers are weighted more than the location information. For instance, for determining the representation a cost function can be used, which decreases with decreasing distances between the representation and the added markers and with decreasing distance between the representation and the location of the object in the respective image as indicated by the location information determined from the image values, wherein the distances between the representation and the added markers contribute more to the cost function than the distance between the representation and the location indicated by the location information determined from the image values. The object detection function can be adapted to determine the representation by minimizing the cost function.

The object detection unit of the registration system can further be adapted to automatically correct for inaccuracies in the user input. This automatic correction will in the following exemplarily be described with reference to FIGS. 8 to 11.

Figure 8:
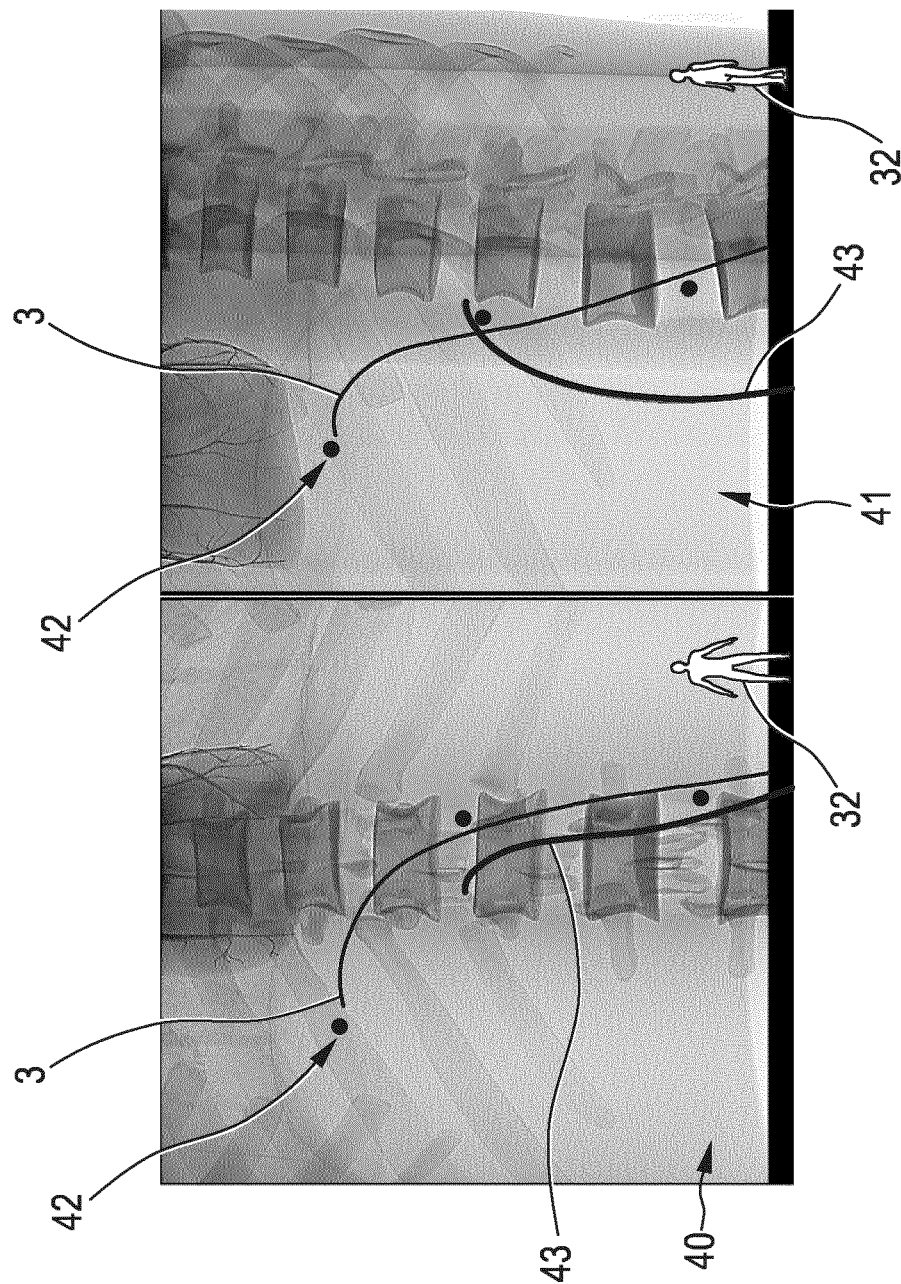
FIG. 8 shows further projection images generated by the imaging device of the interventional system, wherein markers for indicating a location of the guidewire have roughly been added to the projection images.

FIG. 8 shows schematically and exemplarily two two-dimensional x-ray projection images 40, 41, which correspond to two different acquisition directions, i.e. projection directions. In these images 40, 41 the guidewire 3 is visible by the user, who roughly added the markers 42 for indicating the location of the guidewire 3 within the x-ray images 40, 41. The images 40, 41 further show the location 43 of the guidewire 3 as provided by the tracking device before registration. Moreover, the images 40, 41 show a person 32 for indicating the respective projection direction. In other examples the location 43 of the guidewire 3 provided by the tracking device and/or the person 32 may not be shown at this stage.

Figure 9:
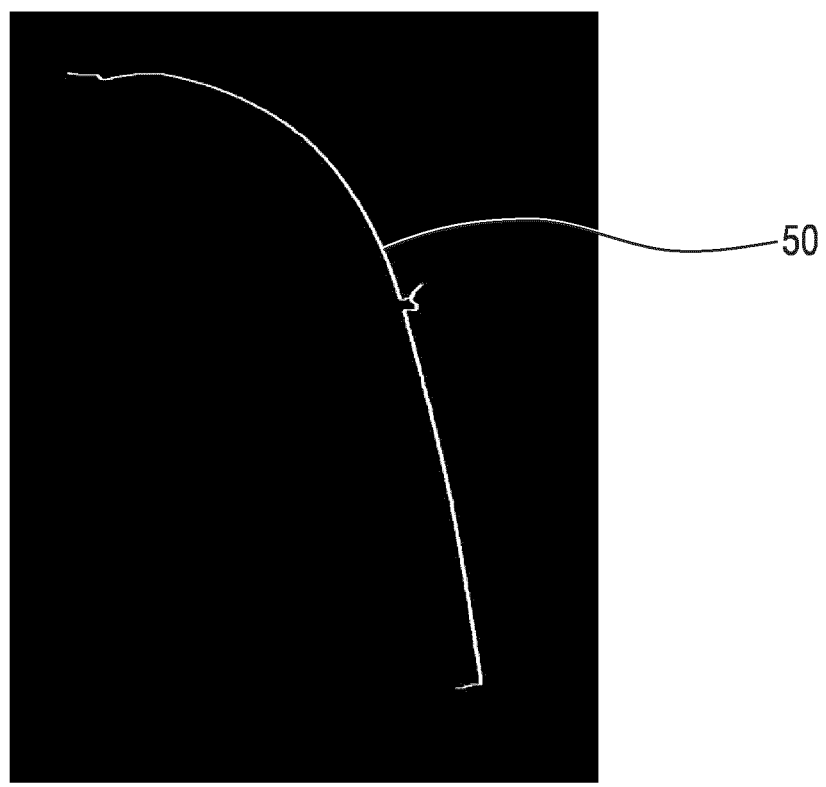
FIGS. 9 and 10 illustrate schematically and exemplarily a path for approximating the guidewire in the respective projection image.
Figure 10:
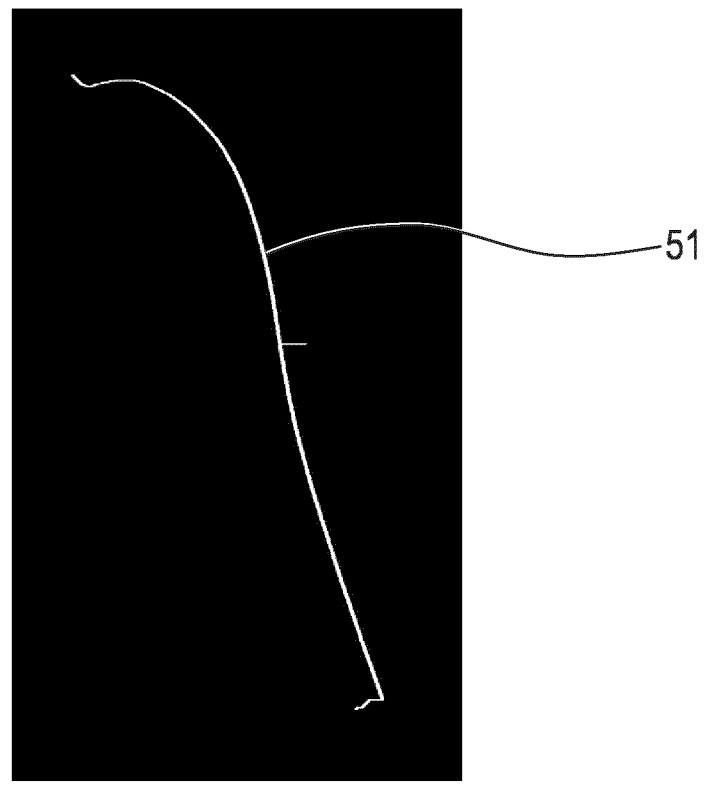

The object detection unit may be adapted to determine location information being indicative of the location of the guidewire 3 in the respective image 40, 41 by detecting a path within the respective image that has a minimum cost based on the user indicated points 42, wherein the cost can be a function of the vesselness response. For instance, the path can be detected such that a cost function is minimized which depends on the vesselness response of the image elements on the path and on the distances between the path and the user indicated points 42. FIG. 9 shows schematically and exemplarily such a detected path 50 for the left image 40 shown in FIG. 8 and FIG. 10 shows schematically and exemplarily such a detected path 51 for the right image 41 shown in FIG. 8. The object detection unit can further be adapted to correct the position of the added markers depending on the location information, i.e. depending on the detected paths 50, 51. In particular, after these paths 50, 51 have been detected, a means score of the vesselness response of the image elements on the respective path 50, 51 can be computed and this measure, which can be regarded as being an average cost, can be compared with a corresponding measure of a respective added marker 42, i.e., in this embodiment, compared with the vesselness response of the respective marker 42. If the difference between the average measure for the respective path 50, 51 and the measure for the respective added marker 42 is larger than a predefined threshold, in the neighborhood of the respective added marker 42 it is searched for an image element or a group of adjacent image elements, for which a measure can be calculated having a smaller difference to the measure calculated for the respective path 50, 51. In this way the position of the respective marker 42 can be automatically corrected by shifting it accordingly. The representation of the guidewire 3 can then be determined based on the markers, which may or which may not have been shifted for automatically correcting them.

Figure 11:
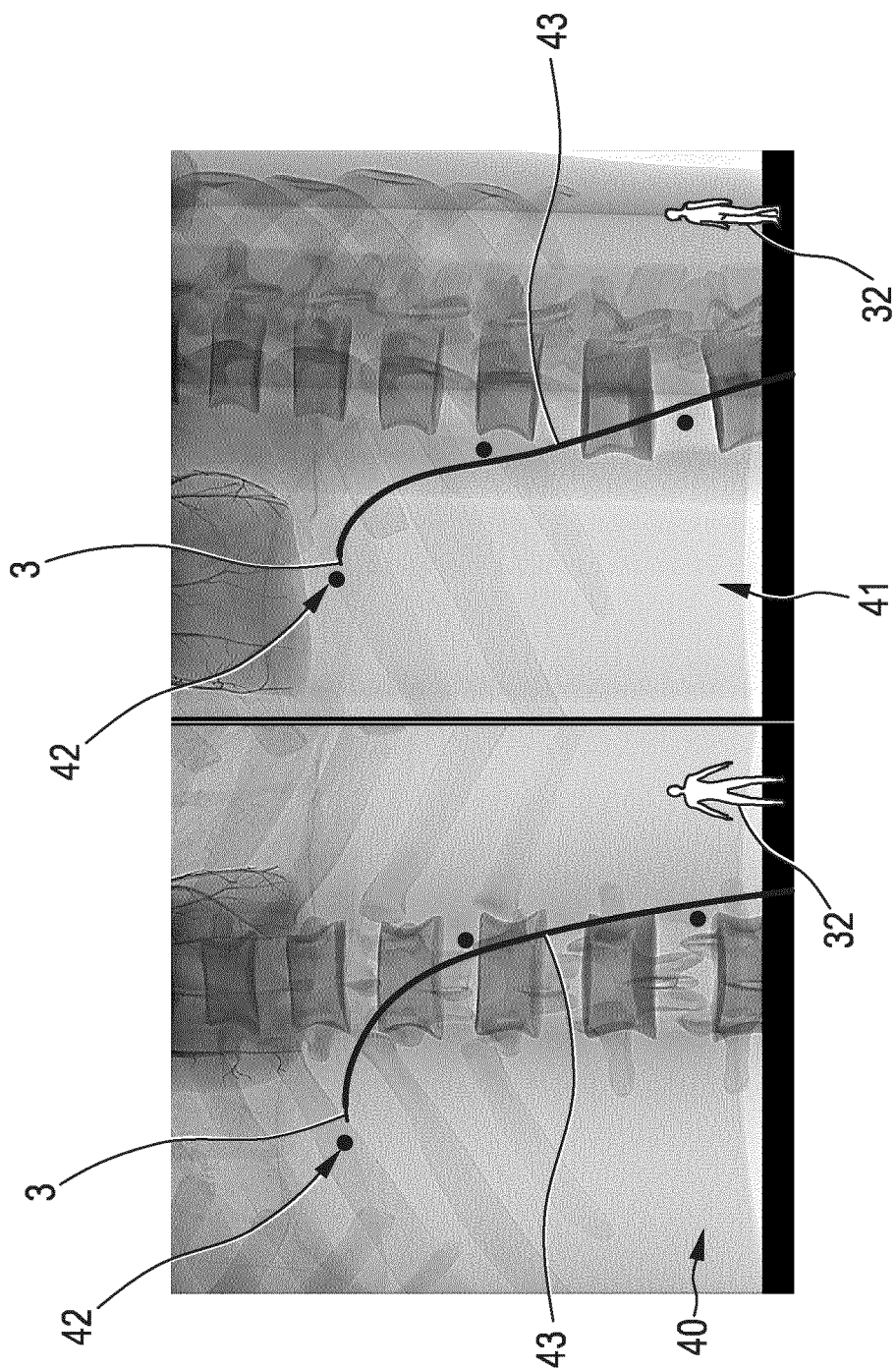
FIG. 11 illustrates schematically and exemplarily a further registration result.

FIG. 11 exemplarily illustrates the result of the registration, which is performed initially based on the roughly added markers 42. As can be seen in FIG. 11, after the registration has been performed, the location 43 of the guidewire 3 provided by the tracking device fits very well to the location of the guidewire 3 shown in the respective image 40, 41, although the initially added markers 42 indicate the location of the guidewire 3 within the respective image 40, 41 very roughly only.

Although in above described embodiments the tracking device is adapted to track the device by using OSS, in other embodiments also other tracking techniques can be used like an electromagnetic tracking technique. Moreover, although in above described embodiments the registration is used in an interventional application, in another embodiment the registration can also be used in another application requiring a registration between a tracking device for tracking an object and an imaging device for imaging the object.

If markers are added to different views, i.e. to different images which correspond to different projection directions, these markers do not need to refer to the same physical points on the guidewire. This leads to improved user friendliness, because the user just needs to identify any point on the guidewire without being bothered about correspondences of points in different views. Moreover, the registration is very robust, because no assumptions about correspondences of identified points are required, i.e. there are no inaccuracies resulting from correspondence mismatches. Furthermore, since it is not necessary to physically attach physical marker elements to the guidewire and since correspondingly these physical maker elements do not need to be recognized in the images, foreshortening, which could be a problem if the physical technical markers are not visible in a certain view, is not a problem when using the registration system and method described above with reference to FIGS. 1 to 11. The registration does also not need any assumption on the visible anatomy in the respective image. Moreover, the registration can be performed during a calibration step before the interventional procedure is started. However, the registration can of course also be performed during an interventional procedure. Furthermore, the registration procedure can be based on low quality images, for instance, on low dose fluoroscopy images, wherein the image quality just needs to be sufficient for allowing a user to add markers to the image.

Figure 12:
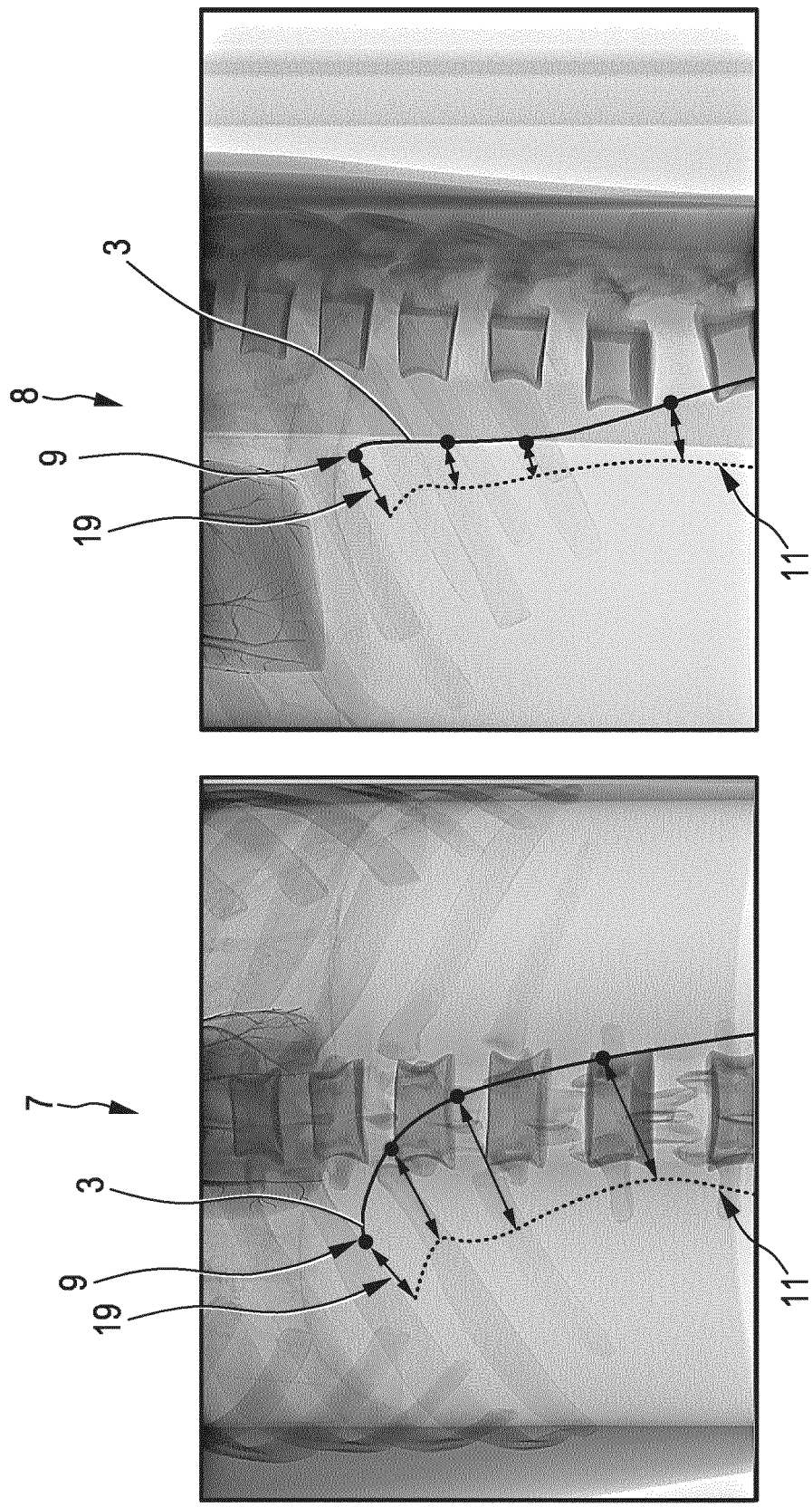
FIG. 12 illustrates schematically and exemplarily a registration procedure.

Although in above described embodiments the object detection unit is adapted to determine a representation of the guidewire in the respective image by determining multiple line segments or a curve based on the added markers, in other embodiments the object detection unit can also be adapted to provide the added markers as the representation of the object in the respective image, without determining, for instance, multiple line segments or a curve. In this case the registration unit is adapted to determine the registration parameters based on the tracked location of the guidewire in the field of view of the imaging device and on the locations of the added markers in the respective image. FIG. 12 schematically and exemplarily illustrates a registration procedure for determining the registration parameters, which is based on the tracked location of the guidewire in the field of view of the imaging device and on the location of the added markers in the respective image.

FIG. 12 shows two two-dimensional projection images 7, 8 having markers 9 added by a user for indicating arbitrary positions in the respective projection image 7, 8, at which the guidewire 3 is located. The dashed lines 11 indicate projected locations of the guidewire 3 tracked by the tracking device and the arrows 19 indicate distances between the added markers 9 and respective closest points on the projected locations 11. The registration unit can be adapted to determine the registration parameters by determining a spatial transformation between a coordinate system of the tracking device and a coordinate system of the imaging device, which minimizes the distances 19, in particular, which minimizes a sum of squared distances 19 or another measure being indicative of the deviation between the added markers 9 and the projected locations 11.

Although in above described embodiments the user has added markers to two different projection images, in other embodiments the user may add the markers not to all projection images, but only to, for instance, a first projection image, wherein for this projection image a first representation of the object can be provided based on the added markers. In another projection image, i.e. a second projection image, a second representation of the object can be determined based on image values of the second projection image. For instance, location information being indicative of the location of the guidewire in the second projection image can be determined based on the image values of the second image. In particular, a segmentation algorithm can be applied to the second projection image for segmenting the guidewire in the second image, wherein the segmented guidewire may be regarded as being the location information and may, in this case, also be regarded as being the second representation. The registration unit can then be adapted to determine the registration parameters based on the tracked location of the guidewire in the imaging region and on the locations of the first and second representations of the guidewire in the first and second projection images. During the registration procedure the first representation receives preferentially a larger weight than the second representation, because it is assumed that the first representation is more reliable than the second representation.

Any of a number of user-friendly ways for the user to assist in device localization for shape to image registration may be provided. These ways include (1) user assistance by defining an ROI that is smaller than an entire image, (2) user assistance by choosing a device segment from the results of an algorithm or (3) user assistance by positioning a device in an algorithm-requested position.

In one embodiment, the user indicates the position of a device point by moving a ROI on a screen displaying a projection image. The ROI can be moved in various directions and its size can be adjusted by zooming-in or out. The algorithm searches for one or more device points in this limited, user-defined region.

The placement and the positioning of the ROI can be done from current touch screen monitor (TSM) devices (by using arrow buttons) as well as newer TSM devices in which one can simultaneously see images and touch on them to provide input.

Figure 13:
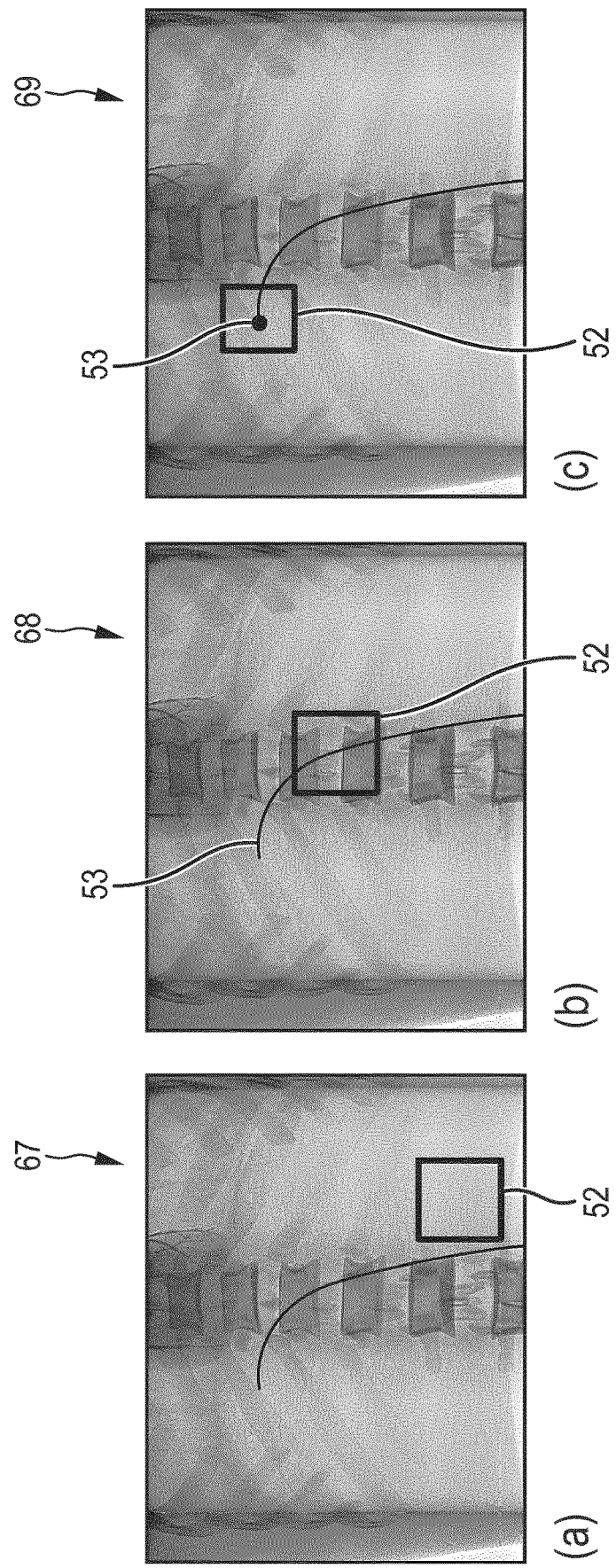
FIG. 13 illustrates schematically and exemplarily a device localization by moving a rectangle.

In FIG. 13(a)-(c) device localization is by moving a rectangle on a projection image 67, 68, 69. The user is provided with a rectangle 52 to indicate an ROI. The user moves and resizes (zooms) the rectangle 52 to the tip of the device as shown in FIG. 13(a)-(c), via TSM buttons. An ROI is presented in FIG. 13(a). Here the ROI is in the form of the rectangle 52, but can be in any closed form that will define a region. The user moves the ROI rectangle 52 in FIG. 13(b) toward the tip 53 in the projection image 68 and fixes the position. At the stage shown in in FIG. 13(c), the algorithm automatically detects the tip in the provided ROI rectangle 52 and shows the result on the projection image 69. At this stage, the algorithm automatically detects the tip 53 in the provided ROI rectangle 52 and shows the result.

Further, the system may show a region-of-interest, such as a bounding box, on the monitor and ask the user to position the device tip within that box before using an image for registration.

Figure 14:
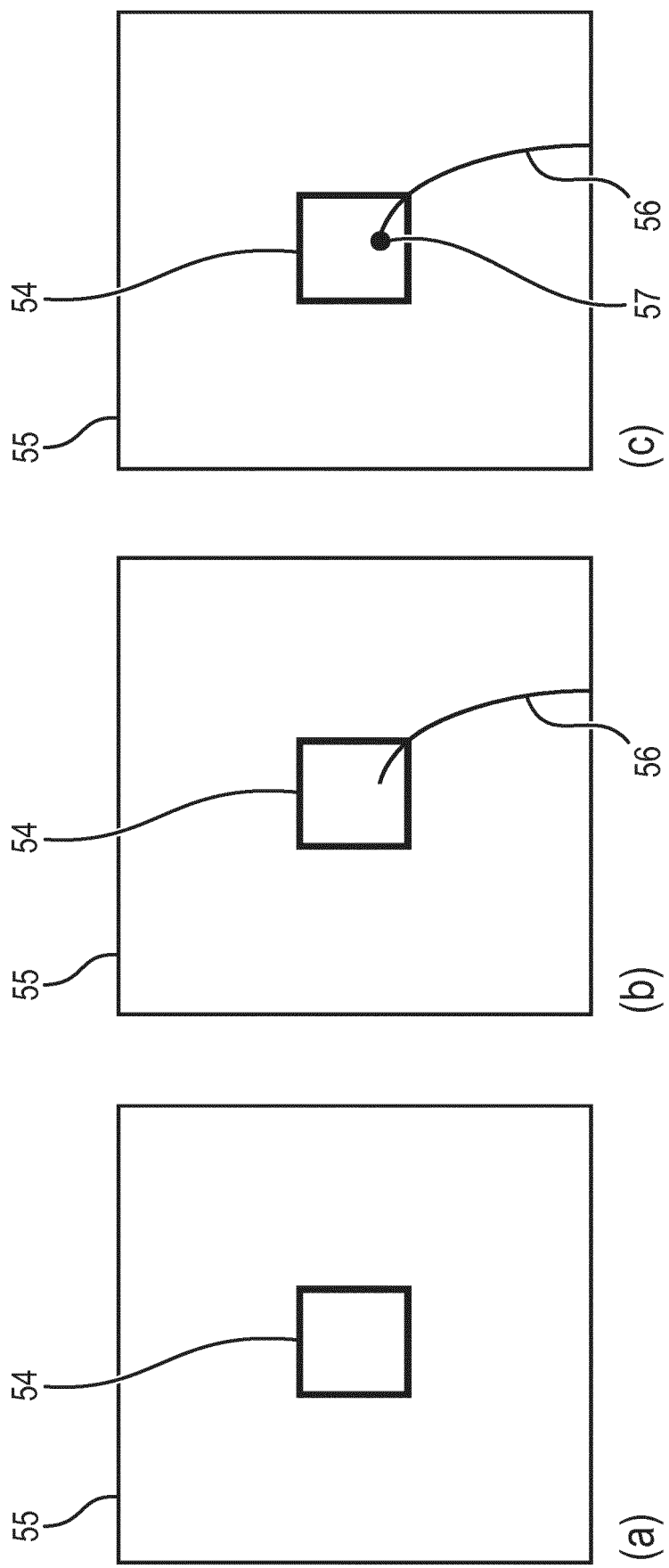
FIG. 14 illustrates schematically and exemplarily a device localization by moving the device in a region of interest.

In FIG. 14 (a)-(c) device localization is by moving the device in an ROI. The system presents a rectangle 54 indicating an ROI on a screen 55 displaying a projection image. The user positions the device 56 within this rectangle and accepts that image as the image to use in shape to X-ray registration. The ROI rectangle 54 is presented where the device is expected to be found (FIG. 14(b)). The user positions the device in the defined/highlighted ROI rectangle 54 and acquires an X-ray image The algorithm automatically detects the tip 57 in the provided ROI rectangle 54 and shows the result (dot in the image at tip 57 in FIG. 14(c)).

Alternatively, a user may choose a device point from a set of candidate results obtained by applying an image analysis algorithm. Each TSM button touch will tab the focus to another candidate result displayed on the image (tabbing navigation). When the correct point is in-focus, the user sets this as a device point. In a touch-sensitive screen, the user can indicate the point by just touching on/around one or more of the displayed candidate results.

Figure 15:
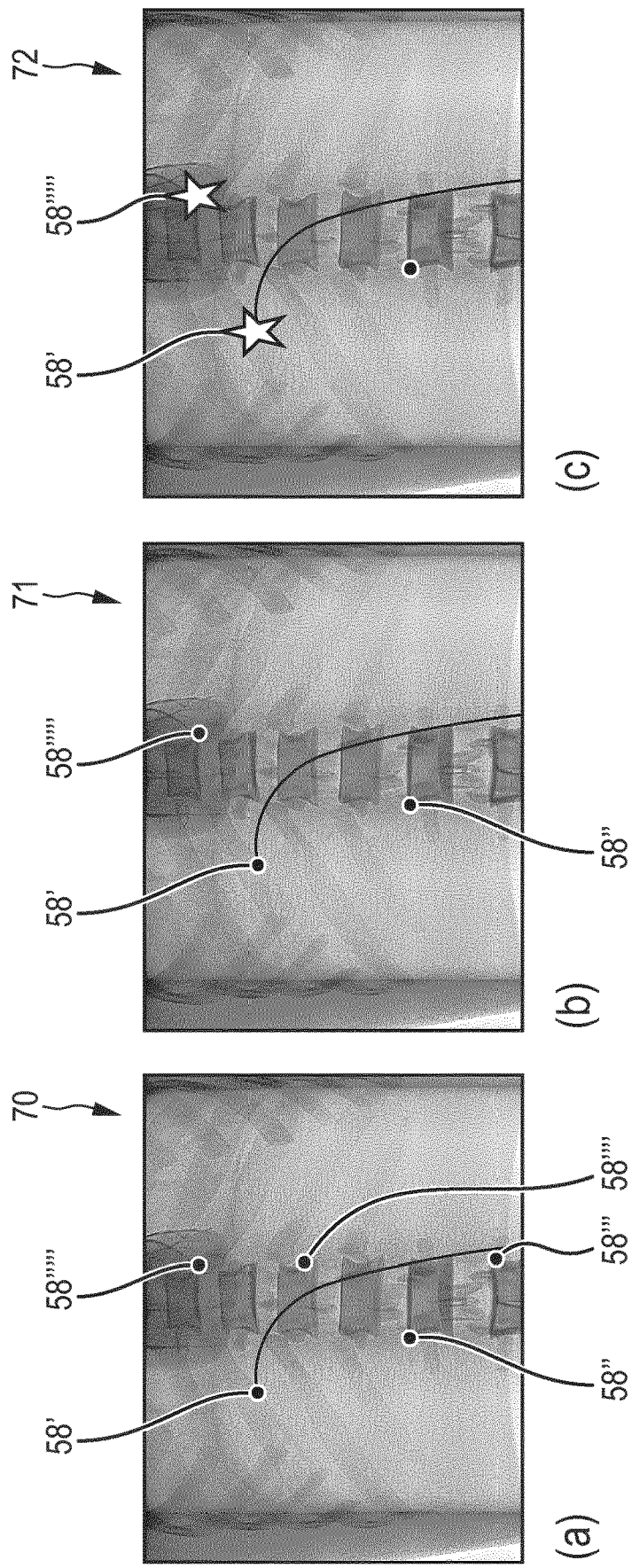
FIG. 15 illustrates schematically and exemplarily, choosing from automatically detected tip candidates.

In FIG. 15 (a)-(c) choice is made from automatically detected tip candidates in projection image (or images) 70, 71, 72. The algorithm detects multiple candidates for the device tip. The user may change the detection threshold and/or select the candidate point corresponding to the actual tip. Candidate tip locations 58', 58'', 58''', 58'''', 58''''' in FIG. 15(a) are automatically presented. The user can reduce the number of detected tips (to 58', 58'', 58''''') as shown in FIG. 14(b) by increasing a detection threshold. The user presses the TSM to tab through the detected tip positions. Shown in FIG. 14(c) is the selected actual tip 58' marked with a star. 58'''' also marked with a star, indicates the next to be selected.

Figure 16:
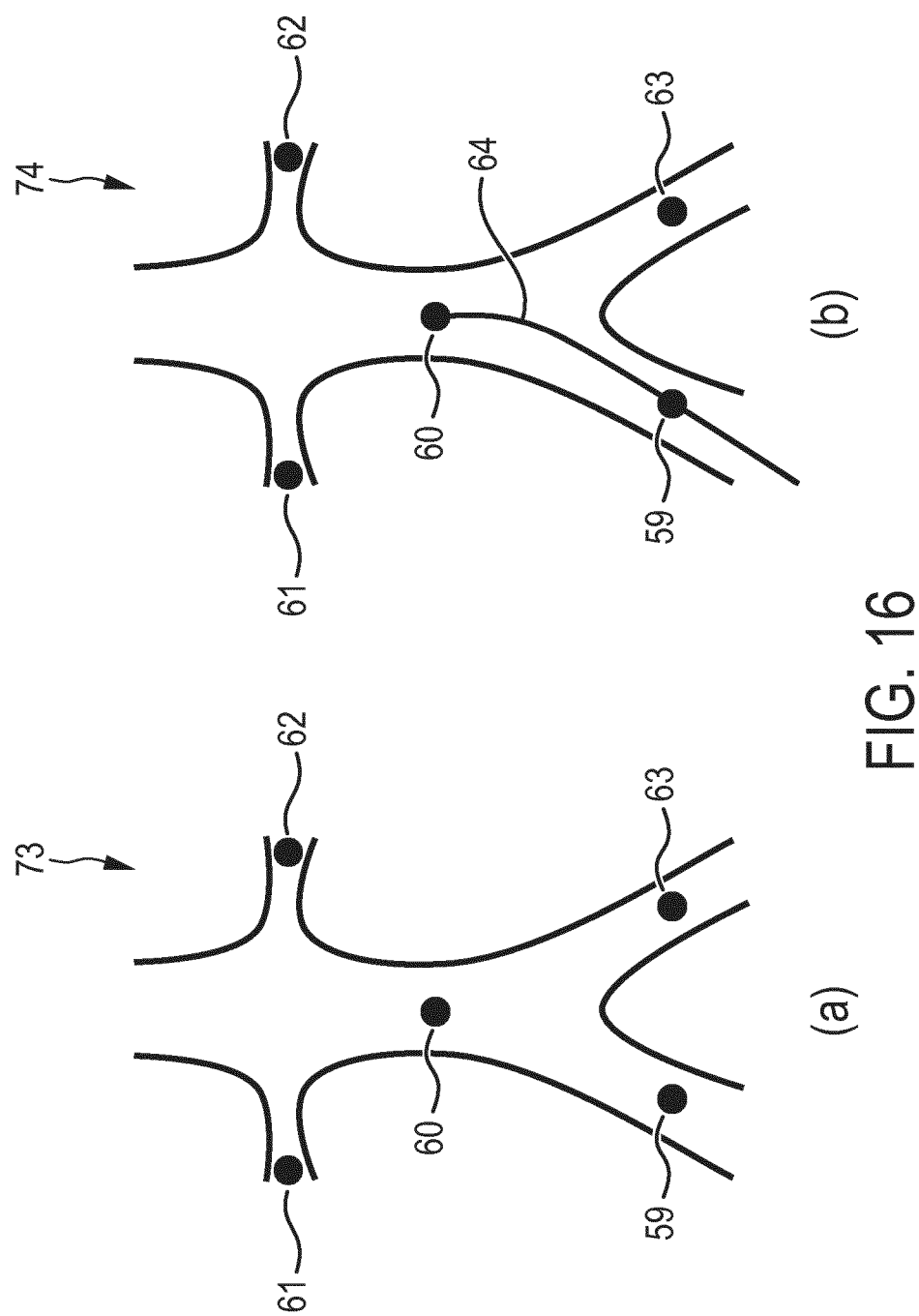
FIG. 16 illustrates schematically and exemplarily, a device localization by moving the device in a defined anatomical position.

In FIG. 16 (a), (b) device localization is by moving the device in a defined anatomical position in projection images 73, 74. The system requests the user to position the device at a specific anatomic location such as 59-R, 60, 61, 62, 63 in FIG. 16(a). The X-ray image having the device at the requested position is accepted by the user as the image to use for registration. The requested position here is 60. The device is navigated to the requested position 60 and the X-ray image at that time instant is used for registration.

Additionally, the system may set the ROIs at pre-defined anatomical positions (the anatomical information may be available to the algorithm from the X-ray/CT registration results from the planning step). When the device tip is close to the expected location, the operator acquires X-ray images for registration.

The system may show multiple ROIs with unique labels (the ROIs can be positioned as a regular grid or can be positioned as a function of an image analysis algorithm) and the user chooses one or more ROIs to indicate the device. The user may use voice commands, TSM buttons, touch screen, or a mouse to select the ROI or ROIs.

Figure 17:
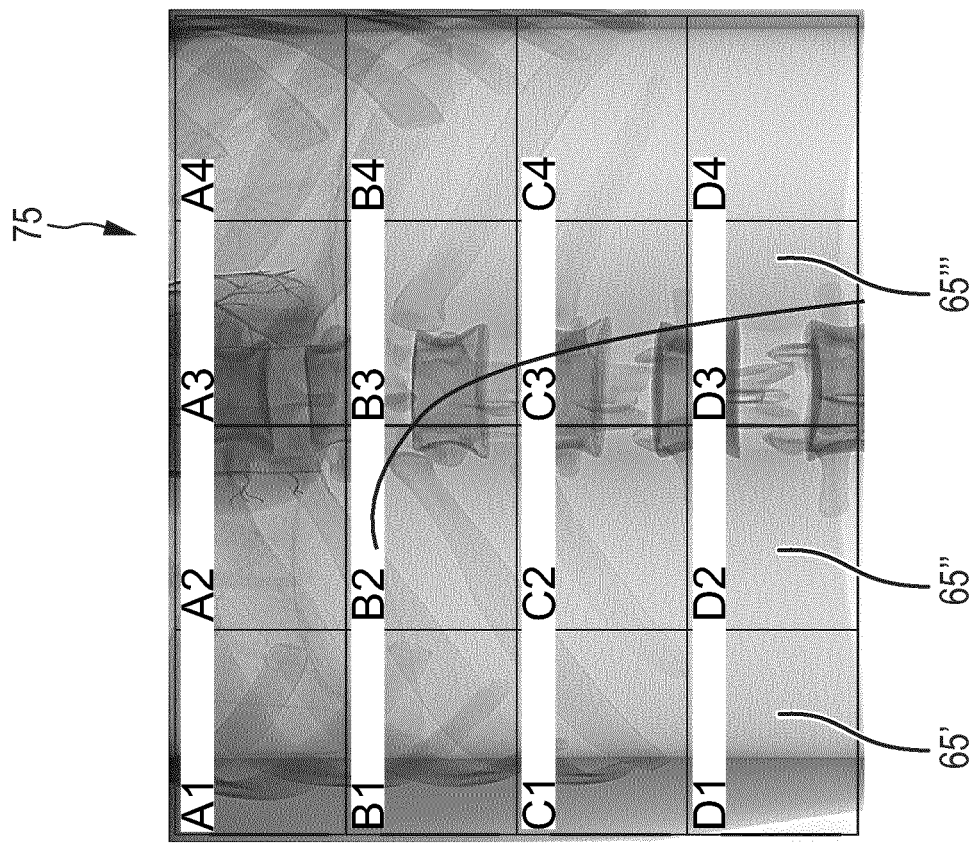
FIG. 17 illustrates schematically and exemplarily choosing from multiple regions of interest.

FIG. 17 illustrates choosing from multiple ROIs on a projection image 75. The system provides multiple ROIs, for example, 65', 65'', 65''' for the user to choose. The user selects one or more of the ROIs by reading their identifier out or by touching, clicking, or using the tabs. The ROIs can have a regular grid structure, can be automatically sized, and can be hierarchical. For instance, once an ROI is selected, the same grid operation can be applied on the selected ROI to define even more limited region.

Figure 18:
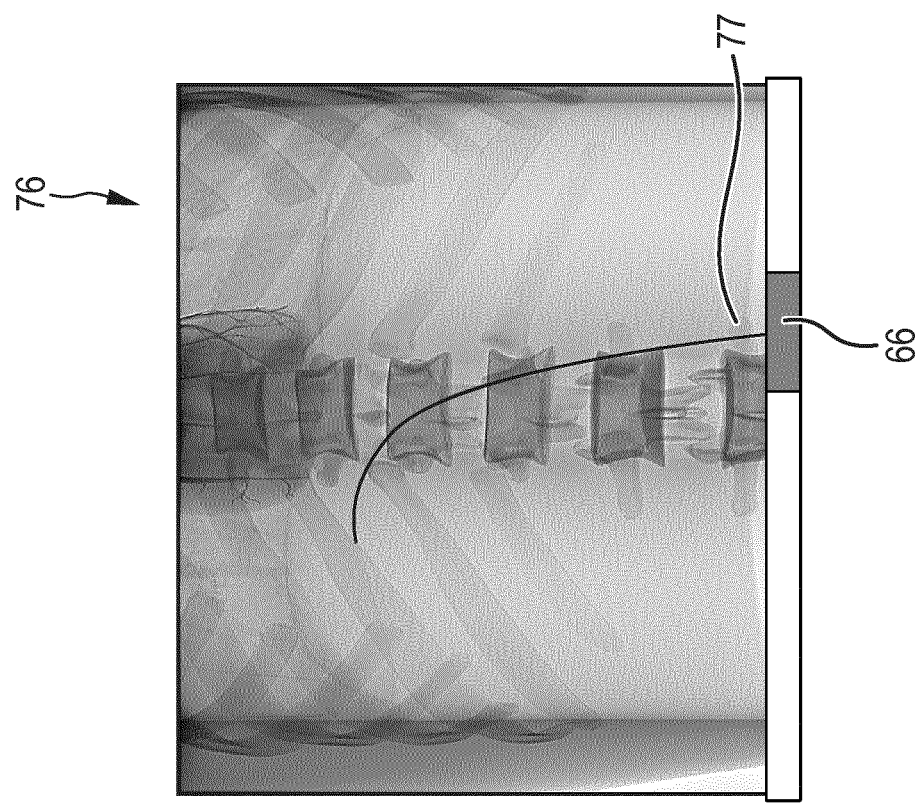
FIG. 18 illustrates schematically and exemplarily use of a slider to define an entrance position of a guidewire.

In some cases, it may be desired to provide the entry point of the device in the image in addition to the tip. In FIG. 18 a slider 66 is used for this purpose to define the entrance position of a wire. To define the position of the wire entrance to the image, the slider 66 can be used as shown in FIG. 18. The user moves the slider to the location of the entrance point 77. In the picture below, the segment of the slider defines the entrance region of the device. The width of the red segment can be adjusted.

The invention can also combine any of the methods above if that is deemed more efficient. For example, there may be multiple devices in the field-of-view and then it might be useful to have the user first indicate a ROI and then choose a candidate from the algorithms result.

Furthermore, if multiple views are used for registration, any input on one view can be used to improve the results presented in the other view. For example, when the tip is detected in the first view with user input, the epipolar line on the second view can be shown and/or only the point candidates around the epipolar line can be presented as valid options. The presented rectangle may be presented so that it is centered on the computed epipolar line and only moves along this line.

Although in above described embodiments certain ways for determining the registration parameters defining a registration of the tracking device with the imaging device have been described, in other embodiments the registration unit can be adapted to determine the registration parameters in another way. For instance, after a user has added markers to several two-dimensional projection images, which correspond to different projection directions, the registration unit can determine a three-dimensional location of the object based on the markers added to the different two-dimensional projection images, wherein the registration parameters can be determined based on this three-dimensional location, which has been derived from the markers added to the two-dimensional projection images, and based on the three-dimensional location of the object provided by the tracking device.

Although in above described embodiments the imaging device is adapted to provide two-dimensional images, wherein the object detection unit is adapted to allow the user to add markers to the two-dimensional images for indicating arbitrary positions in the two-dimensional images, at which the object is located, in other embodiments the imaging device can also be adapted to generate a three-dimensional image of the object like a computed tomography image, a magnetic resonance image, a three-dimensional image reconstructed from different two-dimensional projection images acquired by an x-ray C-arm system, et cetera, and the objection detection unit can be adapted to allow a user to add the markers in the three-dimensional image and to provide a three-dimensional representation based on the added markers. In this case the registration unit can be adapted to determine the registration parameters based on the tracked three-dimensional location of the object in the field of view of the imaging device and based on the three-dimensional location of the representation of the object in the three-dimensional image.

After the tracking device has been registered with the imaging device, the tracked location of the object can also be shown in further images, which have not been acquired by the imaging device, but by a further imaging device, if the imaging device, which has been registered to the tracking device, and the further imaging device are registered to each other. These further images can be, for instance, computed tomography images, magnetic resonance images, et cetera, which may have been acquired before an interventional procedure or during an interventional procedure.

Although the interventional system described above with reference to FIG. 1 is adapted to perform an ablation procedure, in other embodiments the interventional system can be adapted to perform another interventional procedure. Moreover, the registration system and the registration method can also be used in other, non-interventional procedures which require a registration of an imaging device with a tracking device.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the provision of the graphical user interface, the determination of a representation of the object in the image based on the added markers, et cetera performed by one or several units or devices can be performed by any other number of units or devices. The control of the registration system in accordance with the registration method and/or the control of the imaging system in accordance with the imaging method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a registration system for registering an imaging device like an x-ray C-arm device with a tracking device like an optical shape sensing tracking device. An object detection unit is adapted to a) allow a user to add markers to an image of an object for indicating arbitrary positions on the object and b) provide a representation of the object based on the added markers, wherein a registration unit determines registration parameters based on a location of the object tracked by the tracking device and on the location of the representation. This kind of registration can be performed with any object being visible for the user in the image, thereby permitting to use a wide variety of objects for the registration.

The invention claimed is:

1. A registration system for registering an imaging device that generates an image of an object with a tracking device that tracks a tracked location of the object within a field of view of the imaging device by at least determining position and shape of the object, wherein the imaging device is adapted to provide at least two two-dimensional projection images, which correspond to different projection directions, the registration system comprising:
   a graphical user interface that displays the image and which accepts markers from the user as interactive input;
   an object detection unit that detects the object in the image, wherein the object detection unit is adapted to: a) allow a user to add the markers to the image via the graphical user interface for indicating arbitrary positions in the image at which the object is located; b) determine a representation of the object in the image based on the added markers; c) allow the user to add markers to a first image of the two-dimensional projection images for indicating respective arbitrary positions of the object in the first image; and d) provide a first representation of the object in the first image based on the added markers and a second representation of the object in a second image of the at least two two-dimensional projection images based on image values of the second image; and
   a registration unit adapted to register the tracking device with the imaging device by determining a registration parameters based on the tracked location of the object in the field of view and on the locations of the first representation of the object in the first image and the second representation of the object in the second image, wherein the registration unit registers the tracking device with the imaging device by determining the registration parameters defining a registration of the tracking device with the imaging device based on the tracked location of the object in the field of view of the imaging device and on a location of the representation of the object in the image.

2. The registration system of claim 1, wherein the image of the object generated by the imaging device is at least one two-dimensional projection image of the field of view.

3. The registration system of claim 2, wherein:
   the imaging device is adapted to generate at least two two-dimensional projection images, which correspond to different projection directions;
   the object detection unit is adapted to a) allow the user to add markers to each of the at least two two-dimensional projection images for indicating respective arbitrary positions of the object in the at least two two-dimensional projection images and b) determine representations of the object in the at least two two-dimensional projection images based on the added markers, respectively; and
   the registration unit is adapted to register the tracking device with the imaging device by determining the registration parameters based on the tracked location of the object in the field of view and on the locations of the representations of the object in the at least two two-dimensional projection images.

4. The registration system of claim 2, wherein:
the tracking device is adapted to track the tracked location of the object in three-dimensions as a tracked three-dimensional location; and
the registration unit is adapted to register the tracking device with the imaging device by determining the registration parameters by calculating at least one two-dimensional projection of the tracked three-dimensional location of the object under consideration of a projection geometry used by the imaging device for generating the image of the object by generating the two-dimensional projection image and by calculating a spatial transformation between a coordinate system defined by the tracking device and a coordinate system defined by the imaging device, which minimizes a deviation between the calculated two-dimensional projection of the tracked three-dimensional location of the object and the location of the representation of the object in the two-dimensional projection image.

5. The registration system of claim 1, wherein:
the tracking device is adapted to track the tracked location of the object by optical shape sensing; and
the registration unit is adapted to register the tracking device with the imaging device by determining the registration parameters based on the location of the object in the field of view of the imaging device tracked by the optical shape sensing and on the location of the representation of the object in the image.

6. The registration system of claim 1, wherein the registration system is configured to provide assistance to the user, the assistance comprising at least one of (1) defining a region of interest (ROI) that is smaller than the image, (2) choosing a segment of the object from results of an algorithm, or (3) positioning the object in an algorithm-requested position.

7. The registration system of claim 6, wherein the object detection unit is adapted to determine location information indicative of the location of the object in the image based on image values of the image and to provide the representation of the object in the image based on the added markers and based on the location information.

8. The registration system of claim 7, wherein the object detection unit is adapted to provide the representation of the object in the image by correcting positions of the added markers depending on the location information and by providing the representation of the object in the image based on the corrected positions of the markers.

9. The registration system of claim 1, further comprising:
the imaging device that generates the image of the object, wherein the imaging device generates an image of a region of interest that includes the image of the object;
the tracking device that tracks the tracked location of the object in the region of interest by determining the position and the shape of the object; and
a location determination unit that determines the location of the object within the image of the region of interest based on the tracked location of the object and the determined registration parameters.

10. The registration system of claim 9, further comprising:
an interventional instrument used to perform an interventional procedure.

11. A registration method for registering an imaging device that generates an image of an object with a tracking device that tracks a tracked location of the object in a field of view of the imaging device by at least determining position and shape of the object, the registration method comprising:
displaying the image on a graphical user interface which accepts markers from the user as interactive input;
detecting the object in the image by an object detection unit, wherein the object detection unit a) allows a user to add the markers to the image via the graphical user interface for indicating arbitrary positions in the image, at which the object is located, and b) determines a representation of the object in the image based on the added markers;
registering the tracking device with the imaging device by determining registration parameters defining a registration of the tracking device with the imaging device by a registration unit, wherein the registration unit determines the registration parameters based on the tracked location of the object in the field of view of the imaging device and on the location of the representation of the object in the image; and
providing, to the user, assistance comprising at least one of (1) defining a region of interest (ROI) that is smaller than the image, (2) choosing a segment of the object from results of an algorithm, or (3) positioning the object in an algorithm-requested position;
determining, by the object detection unit, location information indicative of the location of the object in the image based on image values of the image;
providing, by the imaging device, at least two two-dimensional projection images, which correspond to different projection directions; and
providing, by the object detection unit, the representation of the object in the at least two two-dimensional images based on the added markers and based on the location information by correcting positions of the added markers depending on the location information and by providing the representation of the object in the at least two two-dimensional images based on the corrected positions of the markers, wherein the object detection unit is adapted to a) allow the user to add markers to a first image of the two-dimensional projection images for indicating respective arbitrary positions of the object in the first image and b) provide a first representation of the object in the first image based on the added markers and a second representation of the object in a second image of the at least two two-dimensional projection images based on image values of the second image, and wherein the registration unit is adapted to register the tracking device with the imaging device by determining the registration parameters based on the tracked location of the object in the field of view and on the locations of the first representation of the object in the first image and the second representation of the object in the second image.

12. The method of claim 11, further comprising:
generating an image of a region of interest by the imaging device;
tracking the tracked location of the object in the region of interest by determining the position and the shape of the object by the tracking device;
determining registration parameters by the registration method of claim 11; and
generating a location image indicating the location of the object within the image of the region of interest based on the tracked location of the object, the image of the region of interest and the determined registration parameters using a location determination unit.

13. The method of claim 11, wherein the image of the object generated by the imaging device is at least one two-dimensional projection image of the field of view.

14. The method of claim 11, further comprising:
generating, by the imaging device, at least two two-dimensional projection images, which correspond to different projection directions,
wherein the object detection unit is adapted to a) allow the user to add markers to each of the at least two two-dimensional projection images for indicating respective arbitrary positions of the object in the at least two two-dimensional projection images and b) determine representations of the object in the at least two two-dimensional projection images based on the added markers, respectively, and
wherein the registration unit is adapted to register the tracking device with the imaging device by determining the registration parameters based on the tracked location of the object in the field of view and on the locations of the representations of the object in the at least two two-dimensional projection images.

15. The method of claim 14, further comprising:
tracking, by the tracking device, the tracked location of the object in three-dimensions as a tracked three-dimensional location,
wherein the registration unit is adapted to register the tracking device with the imaging device by determining the registration parameters by calculating at least one two-dimensional projection of the tracked three-dimensional location of the object under consideration of a projection geometry used by the imaging device for generating the image of the object by generating the two-dimensional projection image and by calculating a spatial transformation between a coordinate system defined by the tracking device and a coordinate system defined by the imaging device, which minimizes a deviation between the calculated two-dimensional projection of the tracked three-dimensional location of the object and the location of the representation of the object in the two-dimensional projection image.

16. The method of claim 11, further comprising:
tracking, by the tracking device, the tracked location of the object by optical shape sensing,
wherein the registration unit is adapted to register the tracking device with the imaging device by determining the registration parameters based on the location of the object in the field of view of the imaging device tracked by the optical shape sensing and on the location of the representation of the object in the image.

17. A registration system for registering an imaging device that generates an image of an object with a tracking device that tracks a tracked location of the object within a field of view of the imaging device by at least determining position and shape of the object, the registration system comprising:
a graphical user interface that displays the image and which accepts markers from the user as interactive input;
an object detection unit that detects the object in the image, wherein the object detection unit is adapted to: allow a user to add the markers to the image via the graphical user interface for indicating arbitrary positions in the image at which the object is located; determine a representation of the object in the image based on the added markers; determine location information indicative of the location of the object in the image based on image values of the image; provide the representation of the object in the image based on the added markers and based on the location information; and provide the representation of the object in the image by correcting positions of the added markers depending on the location information and by providing the representation of the object in the image based on the corrected positions of the markers; and
a registration unit that registers the tracking device with the imaging device by determining registration parameters defining a registration of the tracking device with the imaging device based on the tracked location of the object in the field of view of the imaging device and on a location of the representation of the object in the image, wherein the registration system is configured to provide assistance to the user, the assistance comprising at least one of (1) defining a region of interest (ROI) that is smaller than the image, (2) choosing a segment of the object from results of an algorithm, or (3) positioning the object in an algorithm-requested position.

18. The registration system of claim 17, wherein the image of the object generated by the imaging device is at least one two-dimensional projection image of the field of view.

19. The registration system of claim 18, further comprising:
the imaging device, wherein the imaging device is adapted to generate at least two two-dimensional projection images, which correspond to different projection directions,
wherein the object detection unit is adapted to a) allow the user to add markers to each of the at least two two-dimensional projection images for indicating respective arbitrary positions of the object in the at least two two-dimensional projection images and b) determine representations of the object in the at least two two-dimensional projection images based on the added markers, respectively, and
wherein the registration unit is adapted to register the tracking device with the imaging device by determining the registration parameters based on the tracked location of the object in the field of view and on the locations of the representations of the object in the at least two two-dimensional projection images.

20. The registration system of claim 19, further comprising:
the tracking device, wherein the tracking device is adapted to track the tracked location of the object in three-dimensions as a tracked three-dimensional location,
wherein the registration unit is adapted to register the tracking device with the imaging device by determining the registration parameters by calculating at least one two-dimensional projection of the tracked three-dimensional location of the object under consideration of a projection geometry used by the imaging device for generating the image of the object by generating the two-dimensional projection image and by calculating a spatial transformation between a coordinate system defined by the tracking device and a coordinate system defined by the imaging device, which minimizes a deviation between the calculated two-dimensional projection of the tracked three-dimensional location of the object and the location of the representation of the object in the two-dimensional projection image.

21. The registration system of claim 18, wherein:
the tracking device is adapted to track the tracked location of the object by optical shape sensing; and
the registration unit is adapted to register the tracking device with the imaging device by determining the registration parameters based on the location of the object in the field of view of the imaging device tracked by the optical shape sensing and on the location of the representation of the object in the image.

22. The registration system of claim 18, wherein:
the imaging device generates an image of a region of interest that includes the image of the object; the tracking device tracks the tracked location of the object in the region of interest by determining the position and the shape of the object; and the registration system further comprises:
a location determination unit that determines the location of the object within the image of the region of interest based on the tracked location of the object and the determined registration parameters.

23. The registration system of claim 22, further comprising:
an interventional instrument used to perform an interventional procedure.

24. A non-transitory computer readable medium that stores computer code, executable by a processor, for registering an imaging device that generates an image of an object with a tracking device that tracks a tracked location of the object in a field of view of the imaging device, when executed by the processor, the computer code causing the processor to:
display the image on a graphical user interface which accepts markers from the user as interactive input;
detect the object in the image by an object detection unit, wherein the object detection unit a) allows a user to add the markers to the image via the graphical user interface for indicating arbitrary positions in the image, at which the object is located, and b) determines a representation of the object in the image based on the added markers; and
register the tracking device with the imaging device by determining registration parameters defining a registration of the tracking device with the imaging device by a registration unit, wherein the registration unit determines the registration parameters based on the tracked location of the object in the field of view of the imaging device and on the location of the representation of the object in the image; and provide, to the user, assistance comprising at least one of (1) defining a region of interest (ROI) that is smaller than the image, (2) choosing a segment of the object from results of an algorithm, or (3) positioning the object in an algorithm-requested position;

determine, by the object detection unit, location information indicative of the location of the object in the image based on image values of the image;

provide, by the imaging device, at least two two-dimensional projection images, which correspond to different projection directions; and provide, by the object detection unit, the representation of the object in the at least two two-dimensional images based on the added markers and based on the location information by correcting positions of the added markers depending on the location information and by providing the representation of the object in the at least two two-dimensional images based on the corrected positions of the markers, wherein the object detection unit is adapted to a) allow the user to add markers to a first image of the two-dimensional projection images for indicating respective arbitrary positions of the object in the first image and b) provide a first representation of the object in the first image based on the added markers and a second representation of the object in a second image of the at least two two-dimensional projection images based on image values of the second image, and wherein the registration unit is adapted to register the tracking device with the imaging device by determining the registration parameters based on the tracked location of the object in the field of view and on the locations of the first representation of the object in the first image and the second representation of the object in the second image.

* * * * *